(12) United States Patent
Hisatomi et al.

(10) Patent No.: US 7,370,339 B2
(45) Date of Patent: May 6, 2008

(54) DISC DRIVE APPARATUS

(75) Inventors: Susumu Hisatomi, Fukaya (JP); Akira Matsui, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 349 days.

(21) Appl. No.: 11/274,064

(22) Filed: Nov. 16, 2005

(65) Prior Publication Data

US 2006/0107273 A1 May 18, 2006

(30) Foreign Application Priority Data

Nov. 17, 2004 (JP) ............................. 2004-333372

(51) Int. Cl.
*G11B 33/02* (2006.01)
(52) U.S. Cl. ...................................... 720/653; 720/600
(58) Field of Classification Search ...................... None
See application file for complete search history.

(56) References Cited

U.S. PATENT DOCUMENTS

| 7,225,450 | B2* | 5/2007 | Kim ........................... 720/647 |
| 2005/0034139 | A1* | 2/2005 | Kim ........................... 720/647 |
| 2005/0257231 | A1* | 11/2005 | Hibi ........................... 720/647 |
| 2006/0212889 | A1* | 9/2006 | Hisatomi ..................... 720/658 |

FOREIGN PATENT DOCUMENTS

| JP | 5-28734 | 2/1993 |
| JP | 2000-101362 | 4/2000 |
| JP | 2000-243075 | 9/2000 |
| JP | 2000-268553 | 9/2000 |
| JP | 2001-14768 | 1/2001 |

* cited by examiner

*Primary Examiner*—Allen Cao
(74) *Attorney, Agent, or Firm*—Finnegan, Henderson, Farabow, Garrett & Dunner, L.L.P.

(57) ABSTRACT

A disc drive apparatus has a fixed unit and a collapsible unit which is supported to be expansible and contractible to the fixed unit. A disc drive section is arranged on the fixed unit. The collapsible unit is driven by an expansion/contraction mechanism to expand and contract relative to the fixed unit. An outer housing is fixed to the fixed unit. The outer housing covers the fixed unit and the collapsible unit moved to the contracted position, and has a window capable of passing the collapsible unit. The collapsible unit includes an outer surface exposed to the outside of the outer housing when moved to the expanded position, and an operation panel for setting operation states, which is provided on the outer surface of the collapsible unit and operable from the outside of the outer housing.

5 Claims, 22 Drawing Sheets

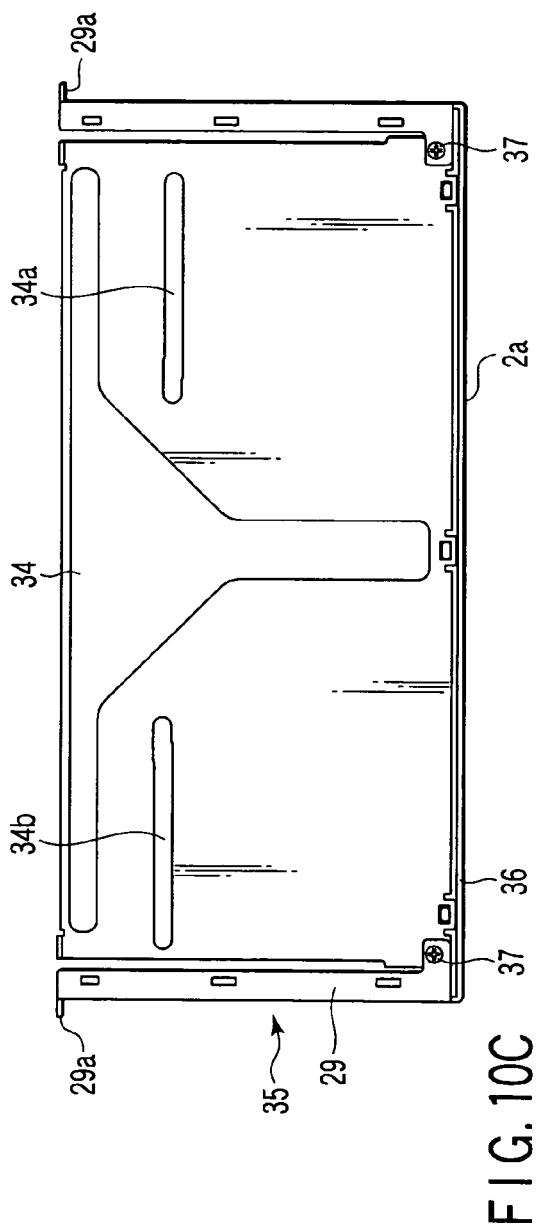
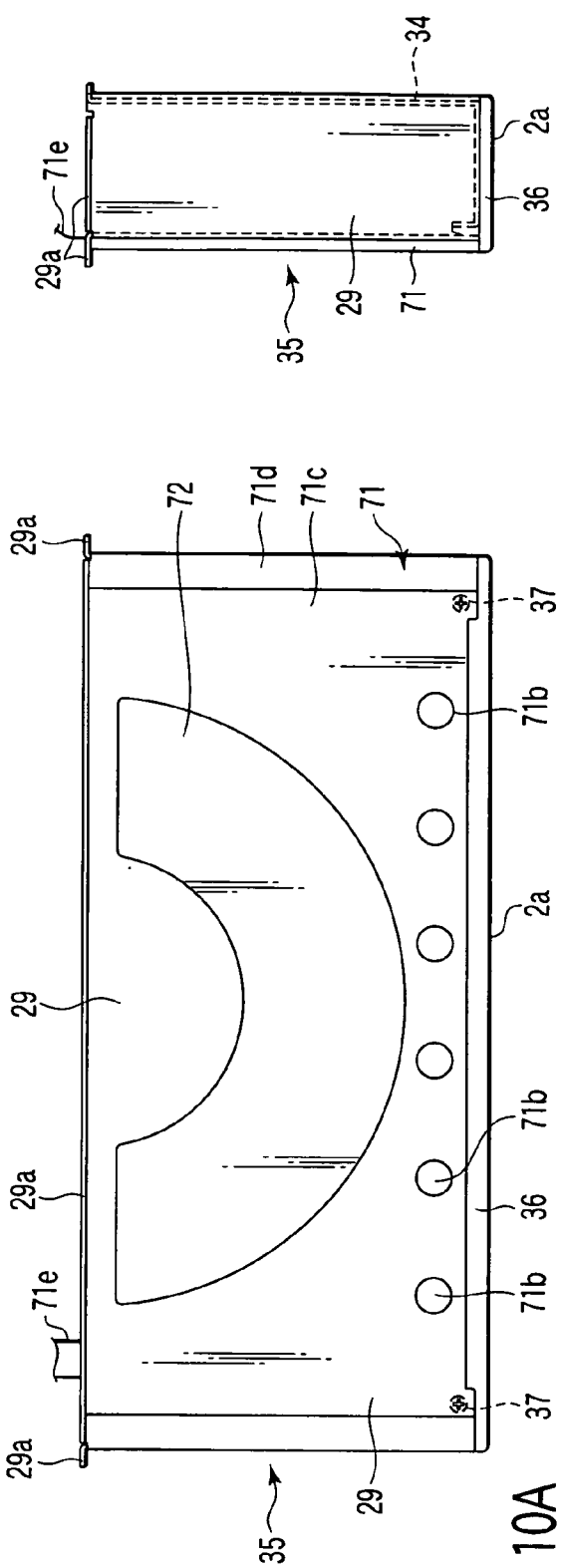
FIG. 10B
FIG. 10A
FIG. 10C

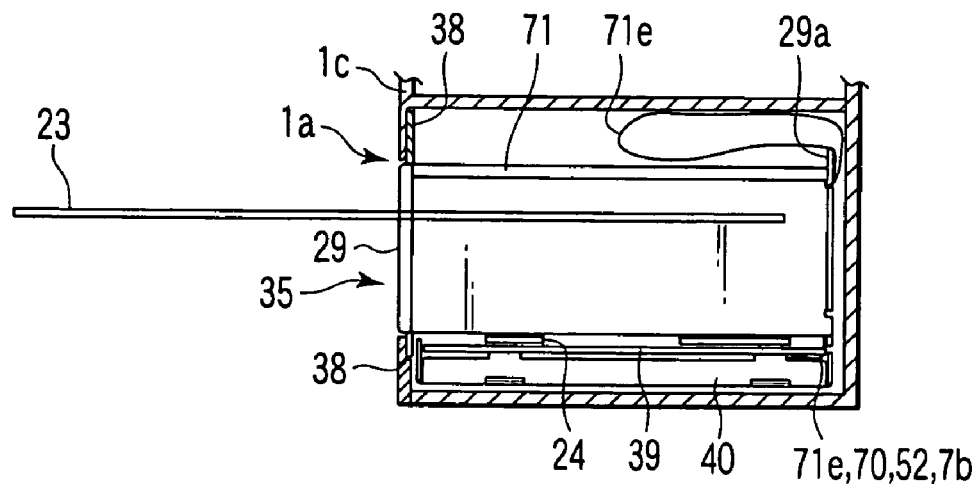
F I G. 11
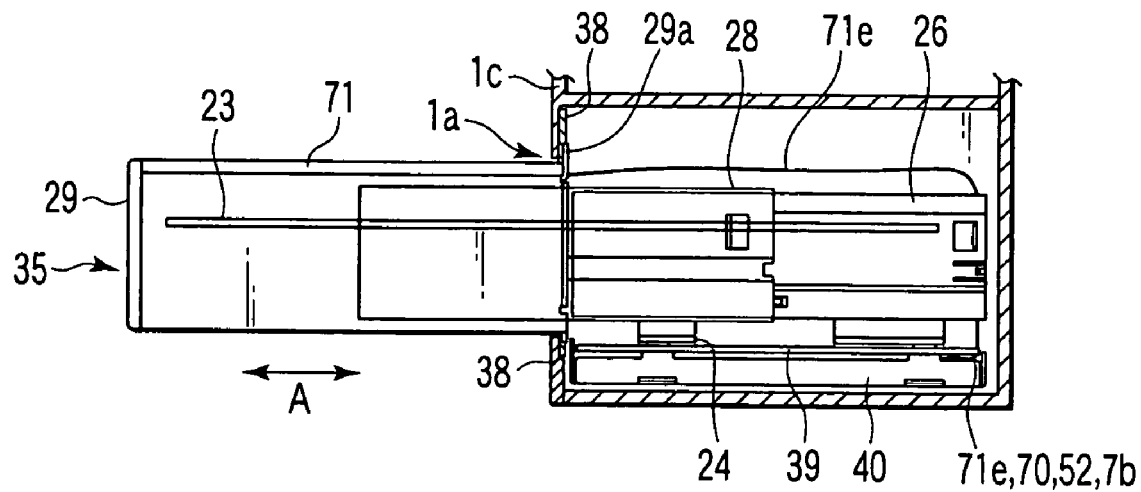
F I G. 12

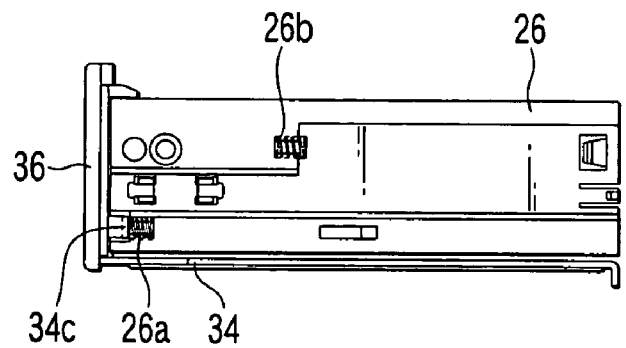
F I G. 13
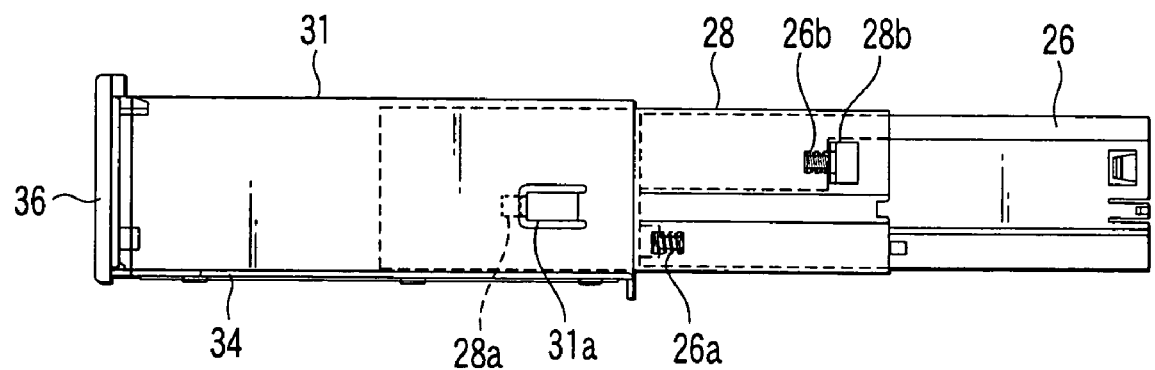
F I G. 14

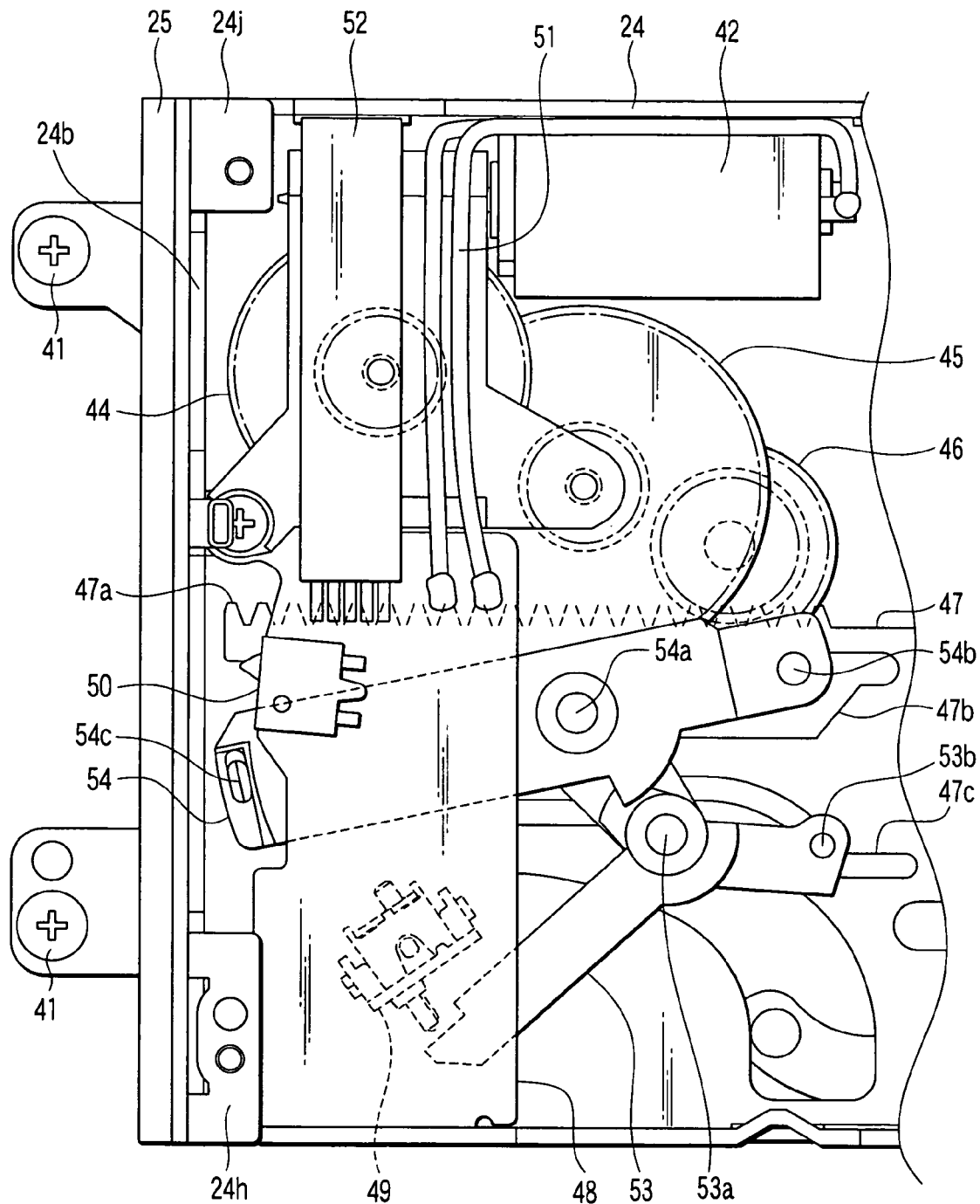
F I G. 15

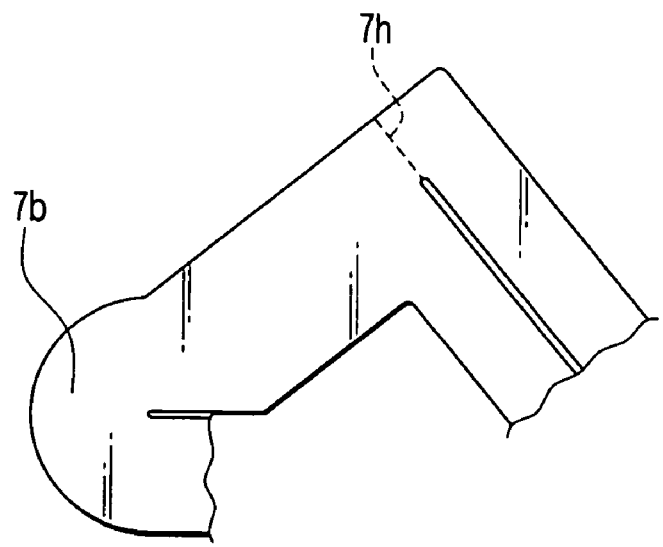
F I G. 31A
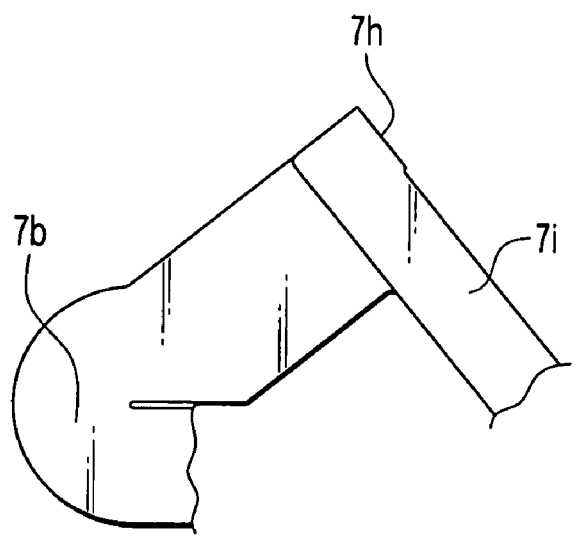
F I G. 31B

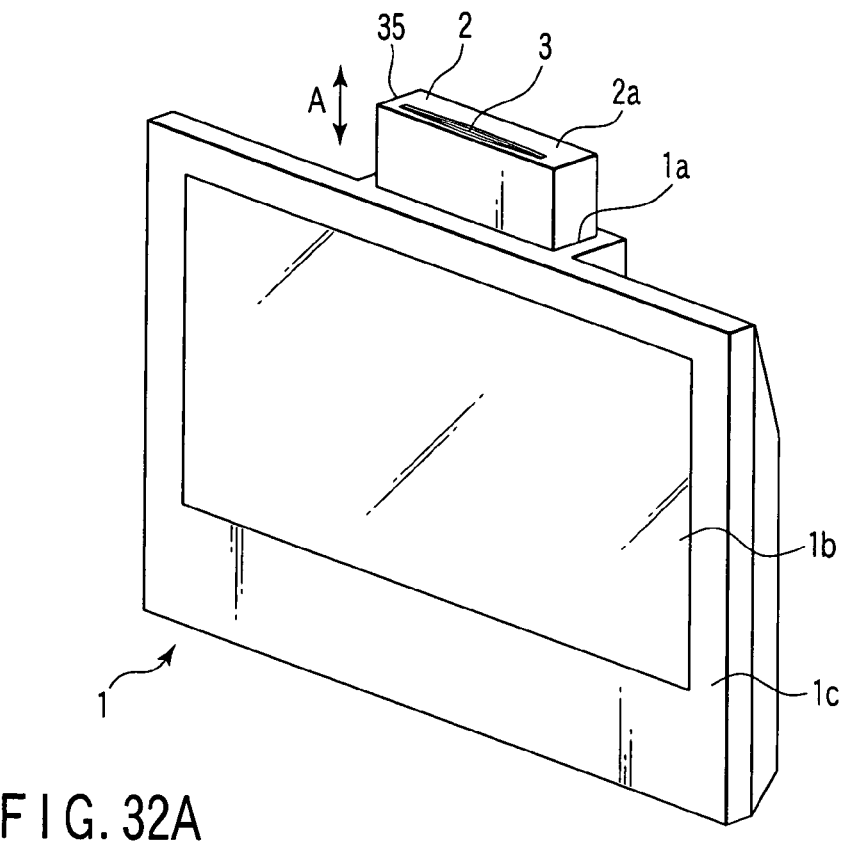
F I G. 32A
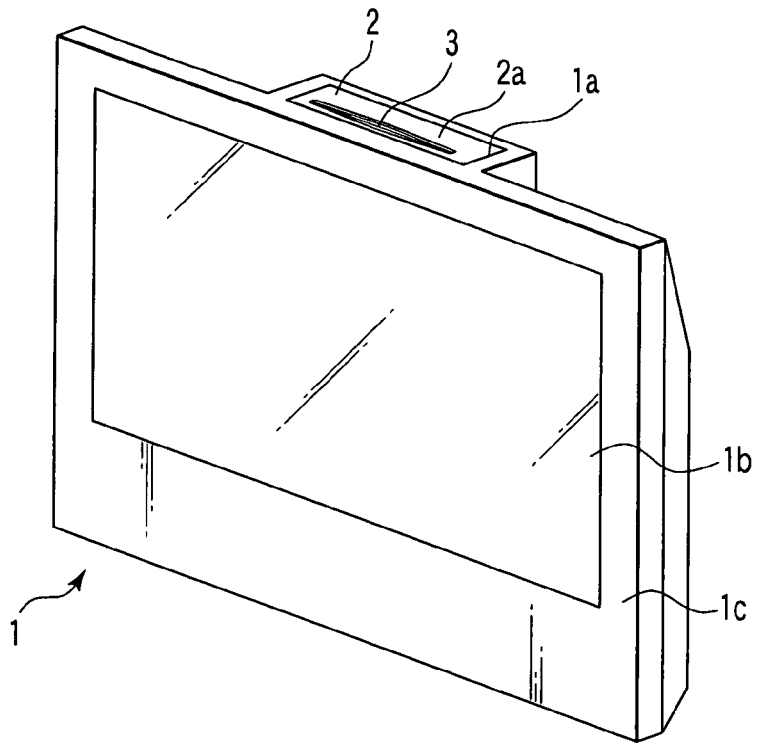
F I G. 32B

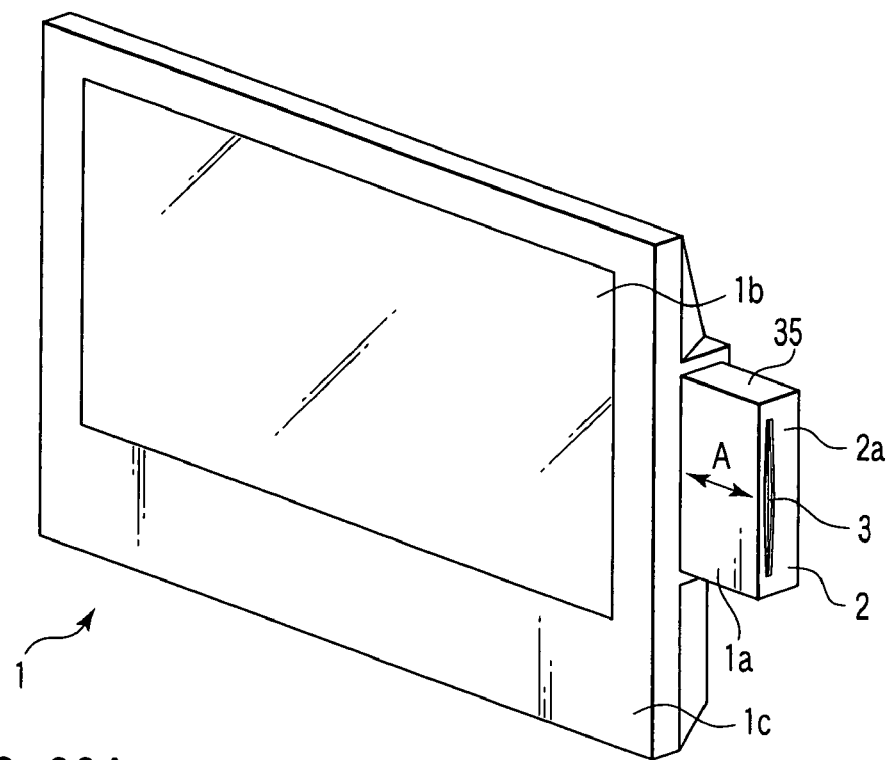
F I G. 33A
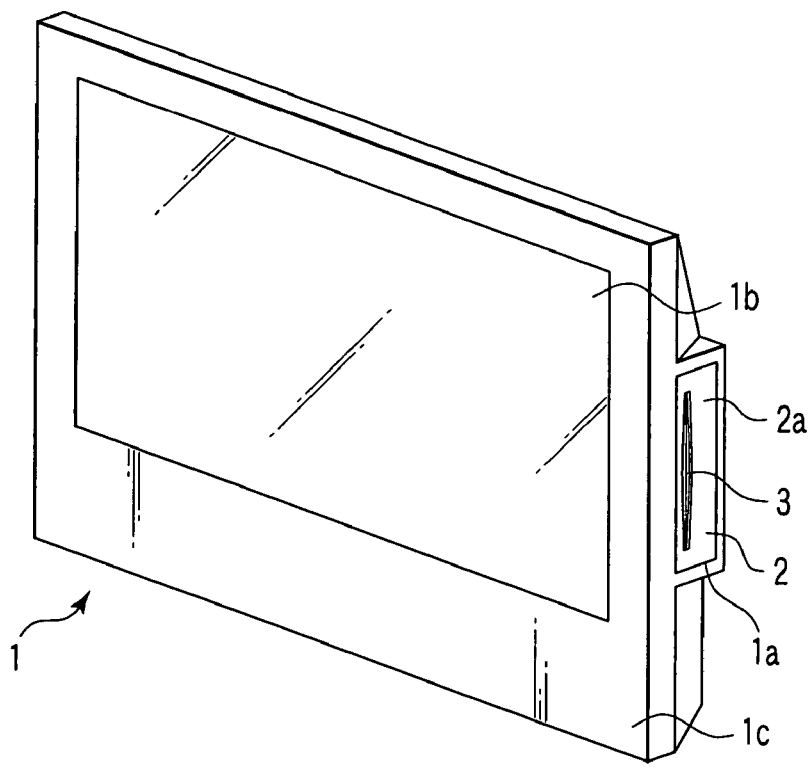
F I G. 33B

DISC DRIVE APPARATUS

CROSS-REFERENCE TO RELATED APPLICATIONS

This application is based upon and claims the benefit of priority from prior Japanese Patent Application No. 2004-333372, filed Nov. 17, 2004, the entire contents of which are incorporated herein by reference.

BACKGROUND OF THE INVENTION

1. Field of the Invention

The present invention relates to a disc drive apparatus which performs information processing for a disc-shaped recording medium, and more particularly, to a collapsible disc drive apparatus which can be reduced in size to become compact when unused.

2. Description of the Related Art

In recent years, a disc drive apparatus has become remarkably compact by miniaturizing a disc drive mechanism. However, in general, a disc drive apparatus is still larger than the size of a disc used as a recording medium.

Usually, in a disc drive apparatus, data is recorded on or played back from a disc in the state that the disc is being housed in a disc housing area in the disc drive apparatus. Therefore, the disc drive apparatus must have a disc housing area large enough to house a whole disc. This makes it difficult to reduce the size of the disc drive apparatus to be smaller than the size of a disc. Thus, it has been difficult to incorporate a reliable easy-to-operate disc drive apparatus with a simple structure in a thin flat-type monitor and the like.

At present, various configurations are proposed to meet the increased demand for miniaturization, reliability and operability of a disc drive apparatus. For example, Jpn. Pat. Appln. KOKAI Publication No. 2000-101362 (paragraphs 0014-0018, FIG. 2) discloses a disc drive apparatus wherein a recording/playback unit is housed in the apparatus and released from the apparatus without spoiling the characteristics of the thin image display apparatus such as a wall-hooked type television. In a disc drive apparatus mounted in a flat thin type monitor, the recording/playback unit is supported in the housing with being in parallel to a display panel when it is unused. Upon ejecting, the recording/playback unit is moved downward in the housing and inclined so as to project outside the housing. When the recording/playback unit is stored in the housing, it is moved upward in the housing while changing the inclination angle of the unit.

However, in the art disclosed in the Jpn. Pat. Appln. KOKAI Publication No. 2000-101362, the recording/playback unit comes in and goes out from the housing. Thus, when a recording medium is placed on the recording/playback unit and the recording/playback unit is housed in the housing, the recording medium and recording/playback unit are hidden in the housing. Therefore, it is impossible to provide an operation panel for setting the recording/playback unit to desired operation states or stop state. In this case, an operation panel is provided in a part of the outside surface of the housing of a flat-type monitor. This becomes a restriction in designing a flat-type monitor.

BRIEF SUMMARY OF THE INVENTION

A disc drive apparatus according to an aspect of the invention comprises: a disc drive section which holds and rotates a disc-shaped recording medium, and performs information processing for the recording medium; a fixed unit on which the disc drive is arranged; a collapsible unit which is held movably in a predetermined expanding/contracting direction, between a contracted position wherein the collapsible unit is laid over the fixed unit and an expanded position wherein at least a part of the collapsible unit projects from the fixed unit to define a disc housing area capable of housing the recording medium, and has a distal end surface provided in the expanding direction of the expanding/contracting direction, and a disc insertion opening provided in the distal end surface, through which the recording medium is inserted into and ejected from the disc housing area in the expanding/contracting direction; an expansion/contraction mechanism which moves the collapsible unit to the fixed unit in the expanding/contracting direction; a disc loading mechanism which loads the recording medium inserted through the disc insertion opening, on the disc drive section; and an outer housing which is fixed to the fixed unit, covers the fixed unit and the collapsible unit moved to the contracted position, and has a front side provided with a window capable of passing the collapsible unit. The collapsible unit includes an outer surface exposed to the outside of the outer housing when moved to the expanded position, and an operation panel for setting operation states, which is provided on the outer surface of the collapsible unit and operable from the outside of the outer housing.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

FIG. 10A is a plane view showing the upper side of a collapsible unit of the disc drive apparatus;

FIG. 10B is a side view showing the right side of the collapsible unit of the disc drive apparatus;

FIG. 10C is a plane view showing the rear side of the collapsible unit of the disc drive apparatus;

FIG. 11 is a side view showing the contracted state of the collapsible unit in the disc drive apparatus;

FIG. 12 is a side view showing the expanded state of the collapsible unit in the disc drive apparatus;

FIG. 13 is a side view showing the contracted state of the collapsible unit in the disc drive apparatus;

FIG. 14 is a side view showing the expanded state of the collapsible unit in the disc drive apparatus;

FIG. 15 is a plane view showing a disc drive of the disc drive apparatus;

FIGS. 31A and 31B are plane views showing another embodiments of FPC cable of an optical pickup in the disc drive;

FIGS. 32A and 32B are perspective views of a flat-type display device according to a second embodiment of the invention; and FIGS. 33A and 33B are perspective views of a flat-type display device according to a third embodiment of the invention.

DETAILED DESCRIPTION OF THE INVENTION

A first embodiment of the present invention will now be explained in detail with reference to the accompanying drawings.

Figure 1:
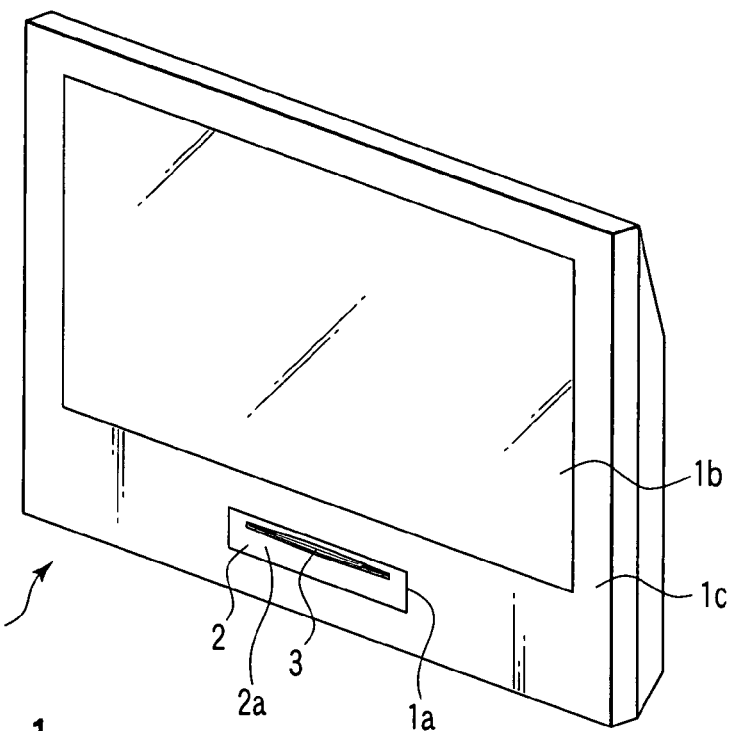
FIG. 1 is a perspective view of a flat-type display device according to a first embodiment of the present invention.

FIG. 1 shows a flat-type display device 1 incorporated with a disc drive apparatus 2 according to the first embodiment. The display device 1 has a flat box-shaped outer housing 1c, an image display panel 1b provided within the outer housing and having a display surface exposed to a display window of the outer housing, and a disc drive apparatus 2 incorporated in the outer housing. The disc drive apparatus 2 is arranged below the image display panel 1b, for example, with respect to the vertical direction, and located in the front side of the display device 1.

A front surface 2a configuring a front end side of the disc drive apparatus 2 is provided with a disc insertion slot 3 through which a disc 23 as a recording medium described later is insert into and eject from the apparatus 2. When the disc drive apparatus 2 is unused, the front surface 2a of the disc drive apparatus is on substantially the same plane as the front surface of the outer housing 1c.

Figure 2:
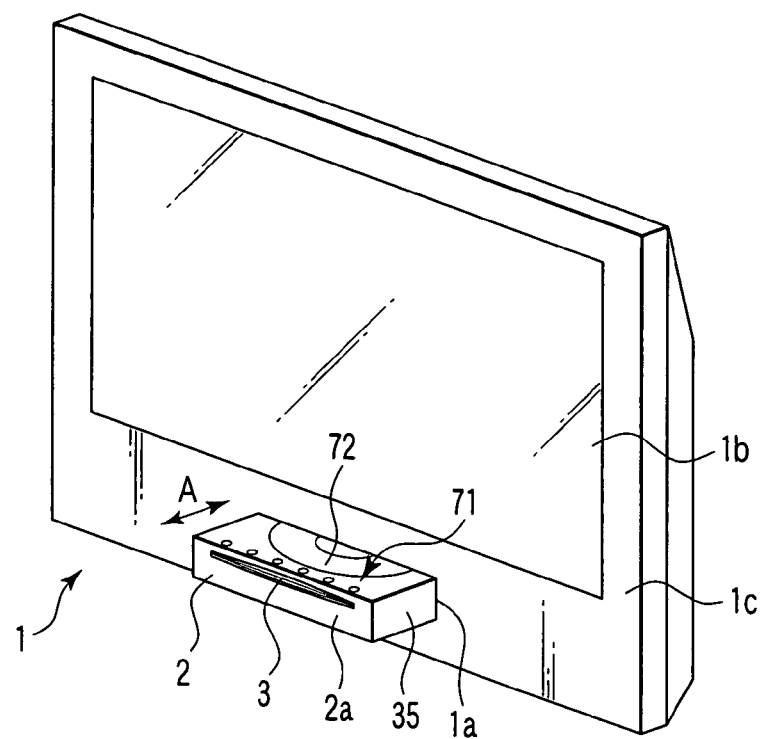
FIG. 2 is a perspective view showing a state of using a disc drive apparatus in the display device.

FIG. 2 shows a state of the disc drive apparatus when a disc is inserted. The front surface 2a of the disc drive apparatus 2 projects from the front surface of the display device 1. On the outer surface of the disc drive apparatus 2, which is exposed by the projection, are provided an operating key portion 71 serving as an operation section for setting the apparatus to desired operation states or stopped state and a visible part 72 to make the interior of the disc drive apparatus 2 visible.

Next, the disc drive apparatus 2 will be explained in detail.

Figure 3A:
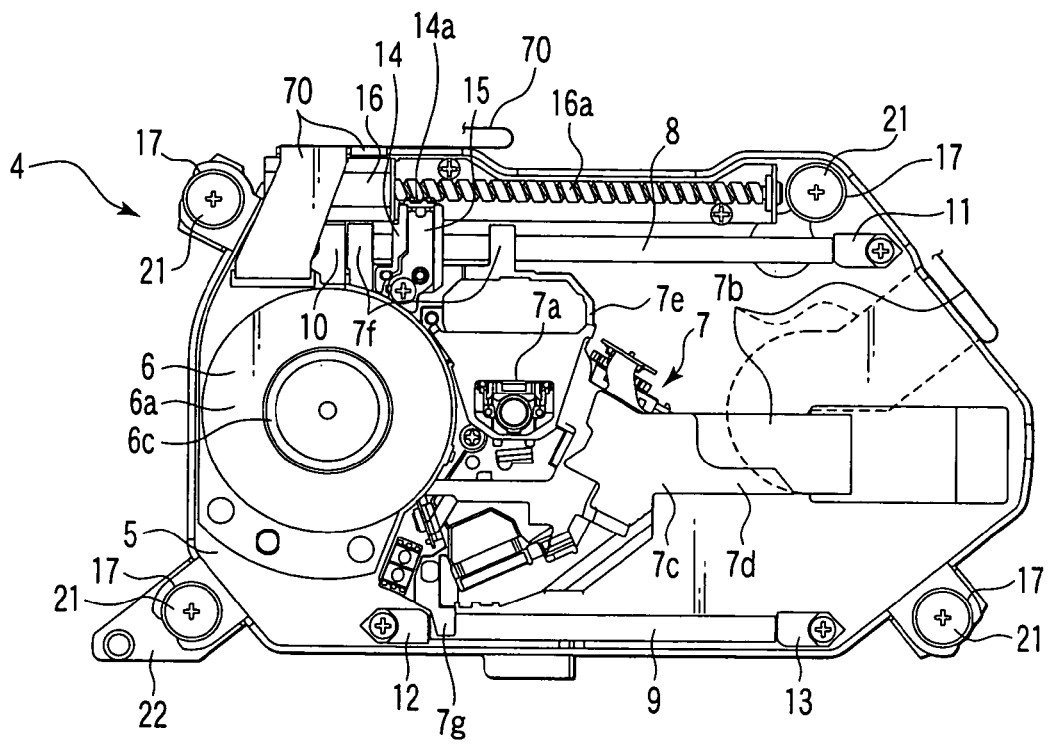
FIGS. 3A and 3B are plane views showing a disc drive section of the disc drive apparatus mounted in the display device, showing different operation states thereof.
Figure 3B:
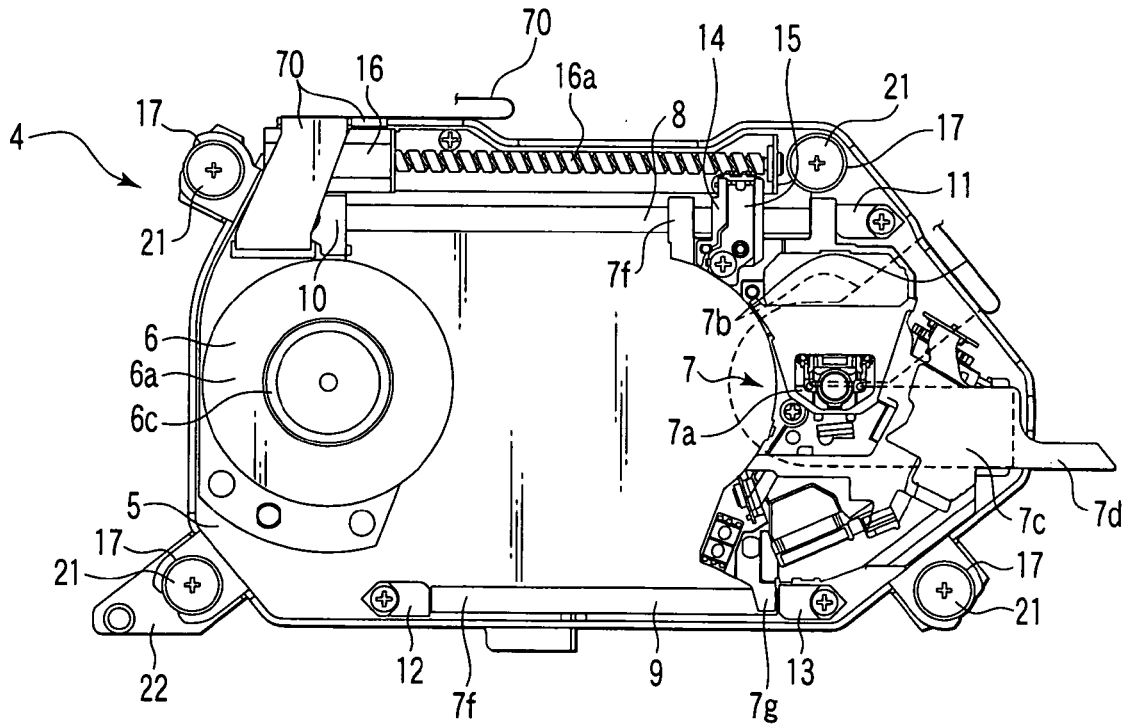
Figure 4:
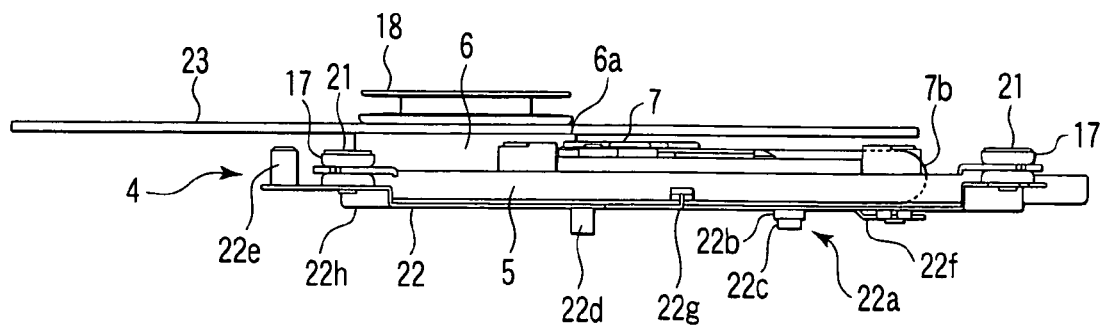
FIG. 4 is a side view of the disc drive apparatus.

FIG. 3A and FIG. 3B are top plane views of a disc drive section 4, which holds and rotates a loaded disc for reading and writing information on the disc. FIG. 4 is a side view of the disc drive section. FIG. 3A shows the state that an optical pickup 7 is moved to the position opposite to the inner peripheral portion of the disc. FIG. 3B shows the state that the optical pickup 7 is moved to the position opposite to the outer peripheral portion of the disc. The disc drive section 4 has a substantially square plate-shaped drive base 5. A disc drive motor 6 is fixed on the drive base 5. The disc drive motor 6 has a rotor. In the upper part of the rotor is formed a turntable 7a on which a disc 23 is to be place. The disc 23 is rotated by the rotation of the disc drive motor 6.

The optical pickup 7 is mounted on the disc drive base 5. The optical pickup 7 has a pickup 7a with a not-shown laser diode and the like, a FPC cable 7b which is a first flexible cable for transmitting a signal, a plate-shaped holding member 7c which is provided on the disc side of the FPC cable 7b and has an extension 7d in the outer circumference of a disc, and a holder 7e for fix these parts. The FPC cable 7b extends toward the outer circumference of a disc, and is looped and stuck to the rear side of the disc drive base 5. The FPC cable 7b further extends to the outer periphery of the disc drive base 5, and stuck to the side of the base 5 bent upward of the rotating direction of the disc drive motor 6. Therefore, the FPC cable 7b forms a loop with the center axis extending substantially in parallel to the rotational axis of the disc drive motor 6, and extends in the upper left direction in the drawing.

The optical pickup 7 is supported by two guide shafts 8 and 9 fixed parallel to the disc drive base 5, and movable in the inner peripheral direction of closing to the disc drive motor 6 and in the outer peripheral direction of separating from the disc drive motor 6. The holder 7e of the optical pickup 7 has a pair of holding members 7f engaging slidable with the guide shaft 8, and a holding member 7g engaging slidable with the guide shaft 9. The holder 7e is held by the holding members 7f and 7g, and slidable on the guide shafts 8 and 9.

Both ends of the guide shaft 8 are fixed to the disc drive base 5 by support members 10 and 11. The guide shaft 9 is fixed to the disc drive base 5 by support members 12 and 13. These four support members 10, 11, 12 and 13 have an adjustment mechanism for adjusting the interval between the guide shafts 8, 9 and the disc drive base 5. A tilt of the optical pickup 7 is adjusted by the adjustment mechanism.

On the holder 7e are provided a rack member 14 placed between the holding members 7f, and a spring member 15 urging the rack member 14 to the outside of the optical pickup 7. A rack 14a is formed on the rack member 14 and located on the outside of the optical pickup 7. The rack 14a engages with a lead screw 16a of a stepping motor 16 provided on the outside of the optical pickup 7.

When the stepping motor 16 is rotated and the rotation is transmitted to the rack member 14 through the lead screw 16a, the optical pickup 7 is moved in parallel along the guide shafts 8 and 9 in a direction corresponding to the rotating direction of the stepping motor 16.

A motor FPC cable 70 serving as a second flexible cable is connected to the disc drive motor 6 and stepping motor 16, and stuck to the side of the disc drive base 5 bent to the upper side of the rotating direction of the disc drive motor 6. The motor FPC cable 70 is looped with the center extending substantially parallel to the rotational axis of the disc drive motor 6, and extends to the left in the drawing.

As shown in FIG. 3B, the holding member 7c placed on the optical pickup 7 has an extension 7d extending in the outer peripheral direction of the disc. When the optical pickup 7 is moved to the position opposite to the outer peripheral portion of the disc 23, the extension 7d projects from the outer contour of the disc drive base 6.

As shown in FIG. 4, in the state that the disk 23 is loaded on the turntable 6a, the disc drive section 4 clamps the disc between the turntable and a clamp member 18. The optical pickup 7 faces to the signal-recording surface of the disc 23. In this time, the FPC cable 7b extends toward the outer periphery of the disc, and is looped and stuck to the rear side of the disc drive base 5. By the extension 7d of the holding member 7c placed on the optical pickup 7, displacement of the FPC cable 7b toward the disc is restricted and contact of the FPC cable 7b with the disc is prevented. Therefore, the contact of the FPC cable 7b with a disc can be prevented with a simple configuration. Another member for preventing the contact is unnecessary, and no sliding contact occurs between the FPC cable 7b and a contact-preventing member, and a sliding loss of the optical pickup 7 can be decreased. This makes it possible to configure a structure of mounting a flexible cable for a pickup with excellent reliability.

As shown in FIG. 3A, FIG. 3B and FIG. 4, a damper 17 is provided at almost four corners of the disc drive base 5. The damper is fixed to a damper base 22 under the disc drive base 5 with a screw member 21.

Figure 5:
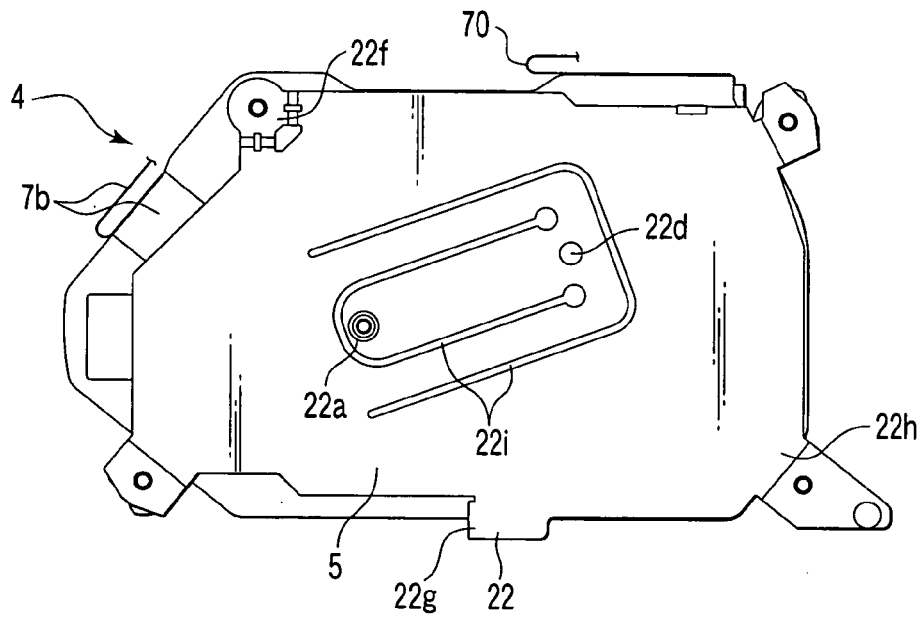
FIG. 5 is a rear view of the disc drive apparatus.

FIG. 5 shows the state of the disc drive section 4 viewed from the rear side. As shown in FIG. 4 and FIG. 5, bosses 22a and 22d are fixed to the damper base 22. The bosses 22a and 22b engage with a cam slider 47 described later, and move the disc drive section 4. Grooves 22i are formed around the bosses 22a and 22d. This gives elasticity to the damper base 22, and it becomes possible to change the height of contact pieces 22f, 22g and 22h provided in the damper base with respect to the bosses 22a and 22d.

Figure 6:
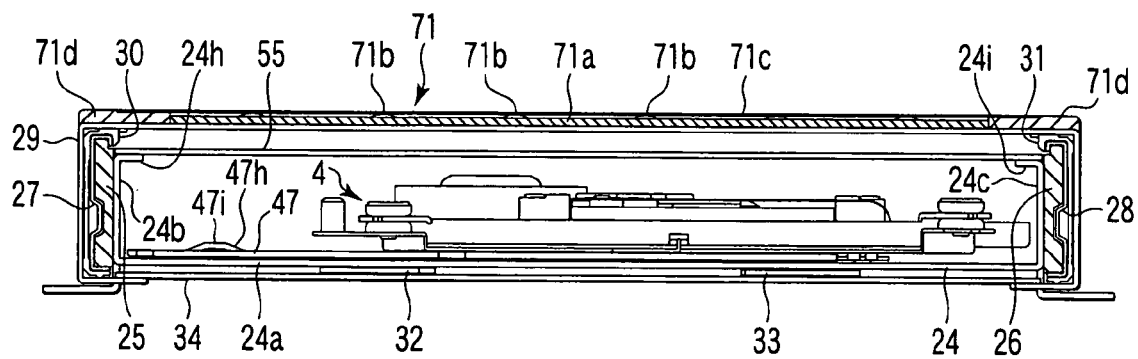
FIG. 6 is a front view of the disc drive apparatus partly broken away and viewed from the front side.

FIG. 6 shows a sectional view of the disc drive apparatus 2 viewed from the front surface 2a. As described later, the disc drive apparatus 2 has a fixed unit which is fixed to the outer housing 1c of the display device 1, and a collapsible unit 35 held movable to, that is, expansible and contractible to the fixed unit. The disc drive section 4 and other driving mechanisms are mounted on the fixed unit.

The fixed unit includes a base body 24 formed in a substantially rectangular cylinder, and base guides 25 and 26. The base body 24 serves as a mounting base to hold various parts directly or indirectly, and is fixed to the outer housing 1c of the display device 1. The base body 24 has a substantially flat rectangular plate-shaped reference plane 24a, left and right bent parts 24b and 24c provided upright at the left and right side edges of the reference plane 24a, and a base top 55 opposite to the reference plane 24a. The base guides 25 and 26 are attached to the outer surface of the bent parts 24b and 24c of the base body 24. Slider guides 27 and 28 are provided on the outsides of the base guides 25 and 26. Front top guides 30 and 31 are provided on the outsides of the slider guides 27 and 28. The front top guides 30 and 31 forms a part of the collapsible unit, and fixed to a front top 29 covering the upper side, both sides and a part of the rear side of the fixed unit. With reference to the base guides 25 and 26 of the fixed unit, the slider guides 27, 28 and front top guides 30, 31 are held slidable toward the front side of the disc drive apparatus 2.

Figure 7:
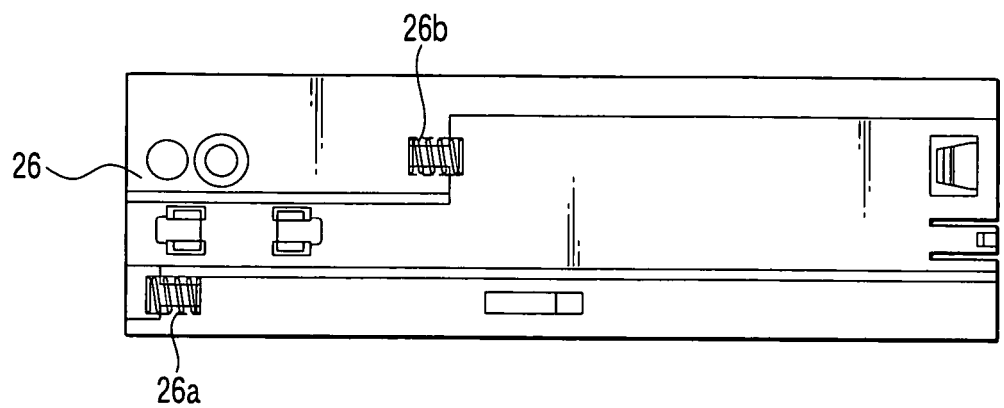
FIG. 7 is a side view of a base guide of the disc drive apparatus, viewed from the right side.
Figure 8:
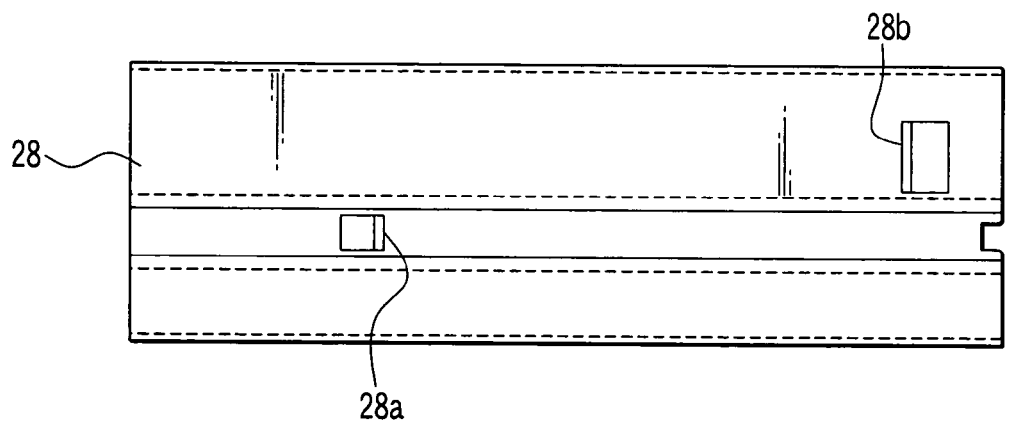
FIG. 8 is a side view of a slider guide of the disc drive apparatus, viewed from the right side.
Figure 9:
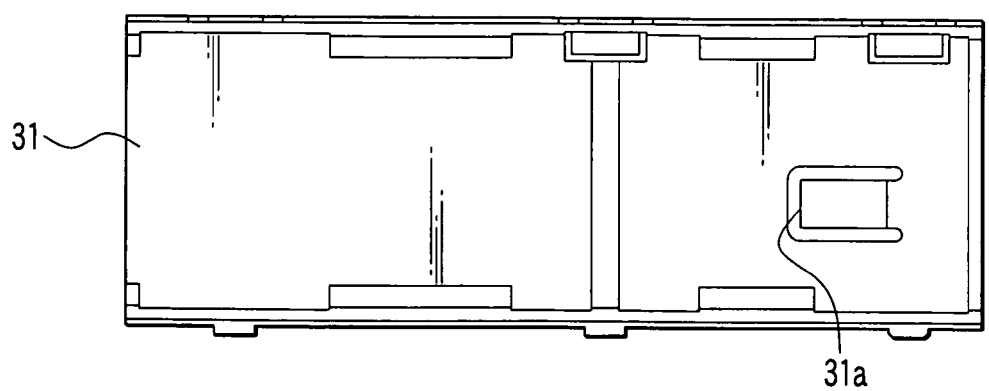
FIG. 9 is a side view of a front top guide of the disc drive apparatus, viewed from the right side.

FIGS. 7, 8 and 9 are part drawings showing right sides of the base guide 26, the slider guide 28 and the front top guide 31, respectively. The base guide 26 is provided with independent pressure springs 26a and 26b for urging an expansion/contraction mechanism between the fixed unit and the collapsible unit 35. The slider guide 28 is provided with claws 28a and 28b. The front top guide 31 is provided with a claw 31a.

The base top 55 is placed on the upper portions 24h, 24i, 24j and 24k (24j and 24k are not shown) of the left and right bent parts 24b and 24c of the base body 24. A loading mechanism for holding a disc and a clamp member driving mechanism are mounted on the base, as described later.

On the upper surface of the reference plane 24a of the base body 24, a cam slider 47 that is a cam member driven by a mode motor 42 is mounted. On the upper side of the cam slider 47, the disc drive section 4 is movably mounted.

On the lower side of the reference plane 24a of the base body 24, a left arm 32 and a right arm 33 described later are mounted. Under the base body 24, a front bottom 34 is placed and fixed to the front top 29 with a screw. The collapsible unit 35 includes the front top 29 serving as an upper surface portion, front top guides 30 and 31, and the front bottom 34, and collapsible with respect to the fixed unit. With reference to the base guides 25 and 25 which are components of the fixed unit, the slider guide 27, 28 and front top guide 30, 31 are held slidable, forming a slide support mechanism.

FIGS. 10A, 10B and 10C are top plane view, right side view and bottom view of the collapsible unit 35, respectively. The collapsible unit 35 includes the front top 29 covering the top and side of the fixed unit and a part of the rear side of the fixed unit, the front bottom 34 covering the rear side of the fixed unit, and a front panel 36 covering the front side of the fixed unit and having a disc insertion slot 3. These components are fixed with screws 37 from the upper and rear sides, thereby the collapsible unit 35 is formed in a flat rectangular box having an opening on the rear side.

As shown in FIG. 6 and FIGS. 10A to 10C, the operation key portion 71 is provided on the upper surface of the front top 29 to permit setting the apparatus to desired operation states or stopped state. The operation key portion 71 has an operation key panel 71a fixed to the upper surface of the front top 29, switches 71b mounted on the operation key panel, a switch cover 71c covering them, and a mounting base 71d for mounting the operation key panel 71a, switches 71b and switch cover 71c.

The rear end edges of the top and side of the front top 29 are bent substantially perpendicularly to the outside, and form a front top bent parts 20a. The front top bent part 29a serving as a projection increases the strength of the front top 29, and prevents ingress of dust to the drive apparatus through the upper surface of the front top 29. This provides a reliable disc drive apparatus with a dustproof mechanism.

On the rear side of the front bottom 34, grooves 34a and 34b are formed and extend in the left and right directions in FIG. 10C. On the upper surface of the front top 29, a transparent visible part 72 is formed to make the inside of the disc drive apparatus 2 visible from the outside. A cable 71a to transmit a signal from the operation key panel 71a extends from the collapsible unit 35 toward the back, that is, the fixed unit.

FIG. 11 is a right side view of the collapsible unit 35 moved to the contracting position, covering the fixed unit, and housed in the outer housing 1c of the display device 1. The base 24 of the fixed unit is fixed to the outer housing 1c. The front side of the outer housing 1c is provided with a window 1a to permit expansion, that is, insertion of the collapsible unit 35. The window 1a is formed rectangular a little larger than the cross section of the collapsible unit 35. A dustproof member 38 is fit all around the window 1a, inside the outer housing 1c. The dustproof member 38 projects to the inside of the window 1a to bring in contact with the top, side and rear of the collapsible unit 35 while the collapsible unit 35 is moving. Felt may be used as a dustproof member 38. This prevents ingress of dust into the display device 1, and provides a reliable disc drive apparatus with a dustproof mechanism.

A main plate 39 is provided under the base body 24. A plate cover 40 is provided under the main plate 39, and fixed to the base body 24. A cable 71e to transmit a signal of a control key and a signal cable described later are connected to the main plate 39 from the rear of the upper surface of the reference plane 24a of the base body 24.

FIG. 12 is a right side view of the collapsible unit 35 moved to the expanding position, and projecting from the front side of the outer housing 1c of the display device 1. The slider guide 28 engaged with the base guide 26 slides about half of the length in the expanding direction A, and the collapsible unit 35 slides almost the full length in the expanding direction. At this time, the dustproof member 38 comes in contact with the top, side and rear of the collapsible unit 35, and the front top bent part 29a comes in contact with the dustproof member 38 of the window 1a. This increases the dustproof effect when the disc drive apparatus is used. The dustproof member 38 keeps in contact with the top and side of the collapsible unit 35 while the collapsible unit 35 is moving between the expanded position and the contracted position, preventing ingress of dust to the display device 1. This provides a reliable disk drive apparatus with a dustproof mechanism.

The operation key portion 71 on the front top 29 not exposed in the contracted state is exposed to the outside when the collapsible unit 35 is moved to the expanded position, enabling operation of the disc drive apparatus 2. The disc drive apparatus 2 cannot be operated unless a disc 23 is inserted, and can be operated only when a disc 23 is inserted. This prevents an operation error while the apparatus is not used, and improve the operability. Further, it is unnecessary to provide operation keys in the outer housing 1c of the display device 1 for operating the disc drive apparatus. This increases the design flexibility of the display device 1. Therefore, the disc drive apparatus can be made more compact with a simple structure, and built in a flat-type display device. This makes a disc drive apparatus practicable with good operability.

The visible part 72 provided on the front top 29 of the collapsible unit 35 is exposed to the outside when the collapsible unit 35 is expanded. Through the visible part 72, the inside of the disc drive apparatus 2 is made visible, and an inserted disc can be visually checked from the outside. This makes it clear at a glance that a disc 23 has been inserted in the disc drive apparatus 2, and makes it easy to confirm the operation state of the apparatus, and prevents an operation error such as insertion of two discs. Therefore, the operability is improved, and the design flexibility of a disc drive apparatus 2 is increased. As a result, a disc drive apparatus is made more compact with a simple structure and can be built in a flat-type display device. This makes a disc drive apparatus practicable with good operability.

The disc 23 inserted in FIG. 11 is moved down by a fixed amount along the disc the rotating axis to be loaded on the disc drive section 4, but not moved in the expanding direction A of the collapsible unit 35.

FIG. 13 shows the relation between the base guide 26 and the front bottom 34 and front panel 36 of the collapsible unit 35 in the state that the collapsible unit 35 is moved to the contracting position. The position of the collapsible unit 35 relative to the base body 24 or base guide 26 is determined by the left arm 32 and right arm 33 described later. In this time, the pressure spring 26a of the base guide 26 is contracted by the projection 34c of the front bottom 34, and urges the collapsible unit 35. The pressure spring 26a and projection 34c have the same structure also in the base guide 25, and urge the collapsible unit 35 on the left and right sides. This prevents rattling of the collapsible unit 35 when moved to the contracting position. The pressure spring 26a or a spring member does not energize the fixed unit, collapsible unit 35 and expansion/contraction mechanism, when the collapsible unit 35 is in the state between the contraction completed state and the expansion completed state, and energizes the fixed unit, collapsible unit 35 and expansion/contraction mechanism, when the collapsible unit 35 is in the contraction completed state. Therefore, the depth dimension of the disc drive apparatus 2 is smaller than the diameter of the disc 23 when unused. When the disc 23 is inserted, the collapsible unit 35 projects from the front side of the disc drive apparatus 2 and defines a disc housing space. The moving load of the collapsible unit 35 is reduced, and the vibration resistance in the contracted state is improved by an antivibration means.

FIG. 14 shows the relation between the base guide 26 and the slider guide 28 and front top guide 31 in the state that the collapsible unit 35 is moved to the expanding position, as in FIG. 12. The position of the collapsible unit 35 to the base body 24 or base guide 26 is determined and locked by the left arm 32 and right arm 33 described later. In this state, the claw 31a of the front top guide 31 engages with the claw 28a of the slider guide 28 to prevent further sliding. In this time, the pressure spring 26b of the base guide 26 is compressed by the claw 28b of the slider guide 28, and energizes the collapsible unit 35 in the contracting direction. The base guide 25, slider guide 27 and front top guide 30 have the same structure, and energize the collapsible unit 35 on the left and right sides. This prevents rattling and vibration of the collapsible unit 35 in the expanded state.

The pressure spring 26b does not energize the fixed unit, collapsible unit 35 and expansion/contraction mechanism, when the collapsible unit 35 is in the state between the contraction completed state and the expansion completed state, and energizes the fixed unit, collapsible unit 35 and expansion/contraction mechanism, when the collapsible unit 35 is in the expansion completed state. Therefore, the depth dimension of the disc drive apparatus 2 is smaller than the diameter of the disc 23 when unused. When the disc 23 is inserted, the collapsible unit 35 projects from the front side of the disc drive apparatus 2 and defines a disc housing space. The moving load of the collapsible unit is reduces, and the vibration resistance in the expanded state is improved.

Figure 16A:
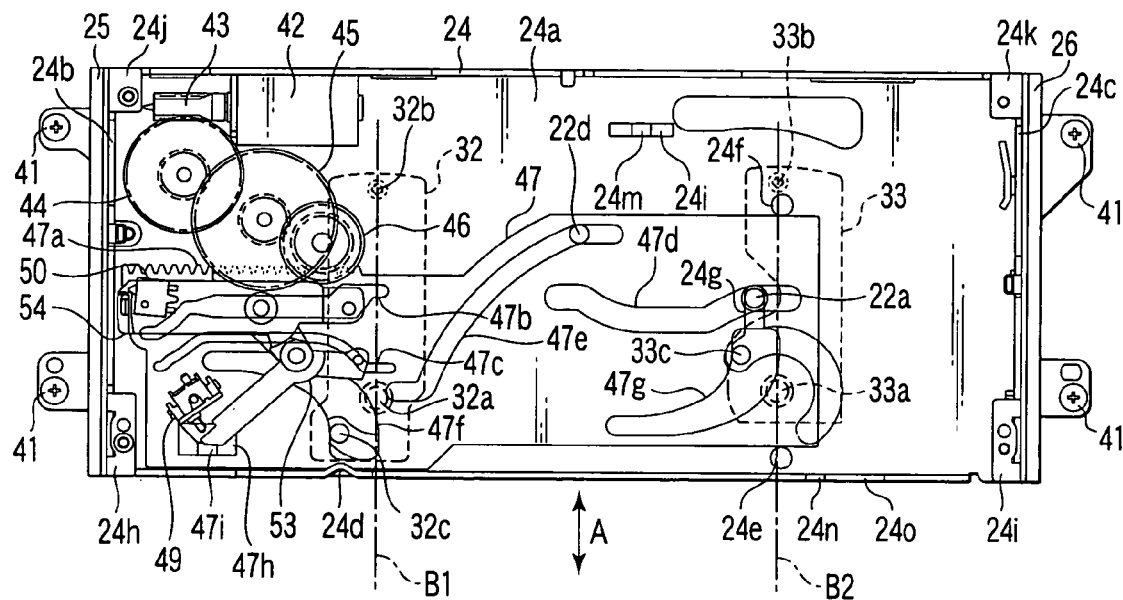
FIG. 16A is a plane view showing the standby state of the disc drive.
Figure 16B:
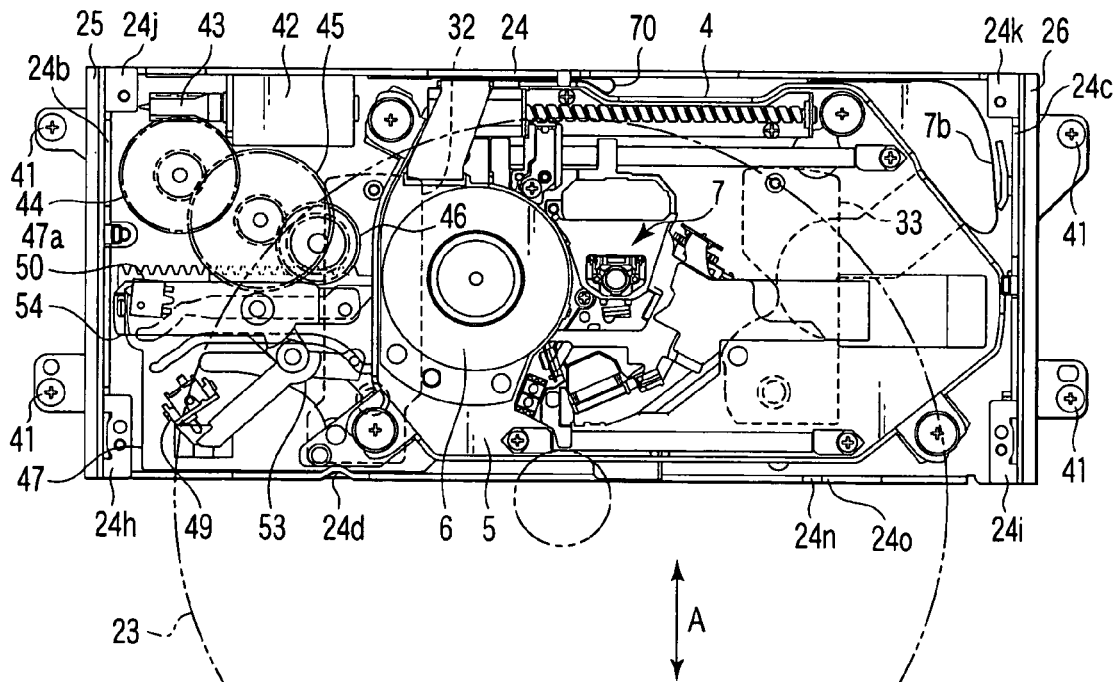
FIG. 16B is a plane view showing the standby state of the disc drive.

Next, explanation will be given on a driving system of the disc drive apparatus 2. FIG. 15, FIG. 16A and FIG. 16B show the essential part of the drive provided on a base body 24. FIG. 16A shows the standby state that the collapsible unit 35 is contracted and a disc can be inserted. FIG. 16B shows the state that the disc drive section 4 is mounted in FIG. 16A.

The base body 24 is fixed to the outer housing 1c of the display device 1 with screws 41. A mode motor 42 is mounted on the base body 24. A worm 43 is fit to the shaft at the distal end of the mode motor 42. The worm 43 engages with gears 44, 45 and 46. A cam slider 47 is mounted on the base body 24. The cam slider 47 has a rack 47a to engage with the gear 46, and cams 47b, 47c, 47d, 47e, 47f and 47g for driving a lever and the like described later. The cam slider 47 is regulated by the base body 24, and movable to the left and right in FIGS. 15, 16A and 16B. When the gear 46 is driven by the mode motor 42, the cam slider 47 moves to the left and right in the drawings, and drives the lever and the like.

A switch substrate 48 is mounted on the base body 24. The switch substrate 48 is equipped with a mode switch 49, a disc detection switch 50 for detecting a disc inserted to a fixed position and make switching, and connected with a cable 51 of the mode motor 42. The switch substrate 48 is connected to the main board 39 under the base body 24 through an FPC cable 52.

The mode switch 49 is turned on and off in accordance with the rotation of the switch lever 53 about the rotation center 53a of the switch lever 53 provided on the base body 24. The disc detection switch 50 serving as a disc detector is turned on and off by the rotation of a first disc drive lever 54 about the rotation center 54a. The switch lever 53 and first disc drive lever 54 has pins 53b and 54b, respectively, provided on each lever, which engage with the cams 47c and 47b of the cam slider 47. When the cam slider 47 is moved, the switch lever 53 and first disc drive lever 54 are rotated, and switch turning on and off of the mode switch 49 and disc detection switch 50. The first disc drive lever 54 has a boss 54c provided on the opposite side of the pin 54b across the rotation center 54a. As described later, the boss 54c engages with the levers of the disc loading mechanism placed on the base top 55 mounted on the upper part of the base body 24. When the disc 23 is inserted, the first disc drive lever 54 is rotated and turns on the disc detection switch 50.

The first disc drive lever 54 has the pin 54b engaging with the cam 47b of the cam slider 47, but the cam 47b is formed wide. Thus, first disc drive lever 54 is rotated and switches the disc detection switch 50 to the ON state in FIG. 16A and the OFF state in FIG. 15. This is the form to switch the disc detection switch 50 from OFF to ON when a disc is inserted, as described later. When the cam slider 47 is moved, the first disc drive lever 54 is rotated and turns off the disc detection switch 50 when a disc is ejected.

As shown in FIG. 4, the boss 22a of the damper base 22 is formed in two layers of a large-diameter boss 22b and a small-diameter boss 22c. As shown in FIG. 16A, the boss 22b engages with the cam 47d of the cam slider 47, and the boss 22c engages with the guide 24g of the base body 24. The boss 22d of the damper base 22 engages with the cam 47e of the cam slider 47. Thus, when the collapsible unit 35 is contracted, that is, in the standby state, the disc drive section 4 is housed in the base body 24. In this time, as shown in FIG. 16B, the center of the disc 23 is at almost the center of the lateral direction, but the disc drive motor 6 of the disc drive section 4 is at a position displaced by a predetermined distance from almost the center of the lateral direction of the disc drive apparatus 2.

The guide 24g is moved in the groove of the same direction as the expanding/contracting direction A of the collapsible unit 35, vertical direction in the drawing, when the cam slider 47 is move to the right. The boss 22a starts movement in the same direction as the expanding/contracting direction along the shape of the cam 47d. The boss 22d moves along the shape of the cam 47e. As described above, the disc driving mechanism includes a mode motor 42, worms 43 to transmit rotation of the motor 42, gears 44, 45, 46, and cam slider 47. The disc driving mechanism moves the disc drive section 4 to the front of the base body 24.

On the lower side of the reference plane 24a of the base body 24, a left arm 32 and a right arm 33 are mounted to control expansion/contraction of the collapsible unit 35. The left arm 32 and right arm 33 have axes 32a and 33a, respectively, at the proximal ends fixed to the base body 24. At the distal ends of the arms, bosses 32b and 33b are provided as projecting portions to engage with the collapsible unit 35. The bosses 32b and 33b project in the direction of separating away from the reference plane 24a, and engage with the grooves 34a and 34b formed in the front bottom 34 of the collapsible unit 35. The left arm 32 and right arm 33 have bosses 32c and 33c, respectively projecting to the reference plane 24a, and engage with cams 47f and 47g of the cam slider 47 provided on the upper surface of the reference plane 24a.

In the contracted state shown in FIGS. 16A and 16B, the bosses 32b and 33b are placed near the rear end of the base body 24 oppositely to the axes 32a and 33a of rotational movement of the left arm 32 and right arm 33, and move the collapsible unit 35 to the contracting position. At the same time, a line B1 connecting the axis 32a of the left arm 32 to the boss 32b and a line B2 connecting the axis 33a of the right arm 33 to the boss 33b are substantially parallel to the contracting direction A of the collapsible unit 35. Thus, the collapsible unit 35 can be held at the contracting position against an external force acting in the expanding direction A of the collapsible unit 35. This builds up a lock portion of the expansion/contraction mechanism in the contracted state.

When the cam slider 47 is moved to the right from the contracted state shown in FIGS. 16A and 16B, the bosses 32c and 33c are driven along the shapes of the cams 47f and 47g. Thus, the left arm 32 is turned counterclockwise and the right arm 33 is turned clockwise, and the collapsible unit 35 is driven by the left arm and right arm and move to the expanded state. Namely, the expansion/contraction drive section of the expansion/contraction mechanism is formed of the left arm 32, right arm 33, and cam slider 47 for driving the arms. The expansion/contraction mechanism is formed of the mode motor 42, worm 43 for transmitting the rotation of the mode motor 42, gears 44 to 46, and expansion/contraction drive section.

In the standby state, the FPC cable 7b of the optical pickup 7 is stuck to the side of the disc drive base 5, looped with the center almost parallel to the rotation axis of the drive motor 6 and extended to the upper left in the drawing, and connected to the main substrate 39 placed on the lower side of the base body 24. The motor FPC cable 70 is stuck to the side of the disc drive base 5, looped with the center almost parallel to the rotation axis of the disc drive motor 6 and extended to the upper left in the drawing, and connected to the main substrate 39 placed on the lower side of the base body 24.

Figure 17:
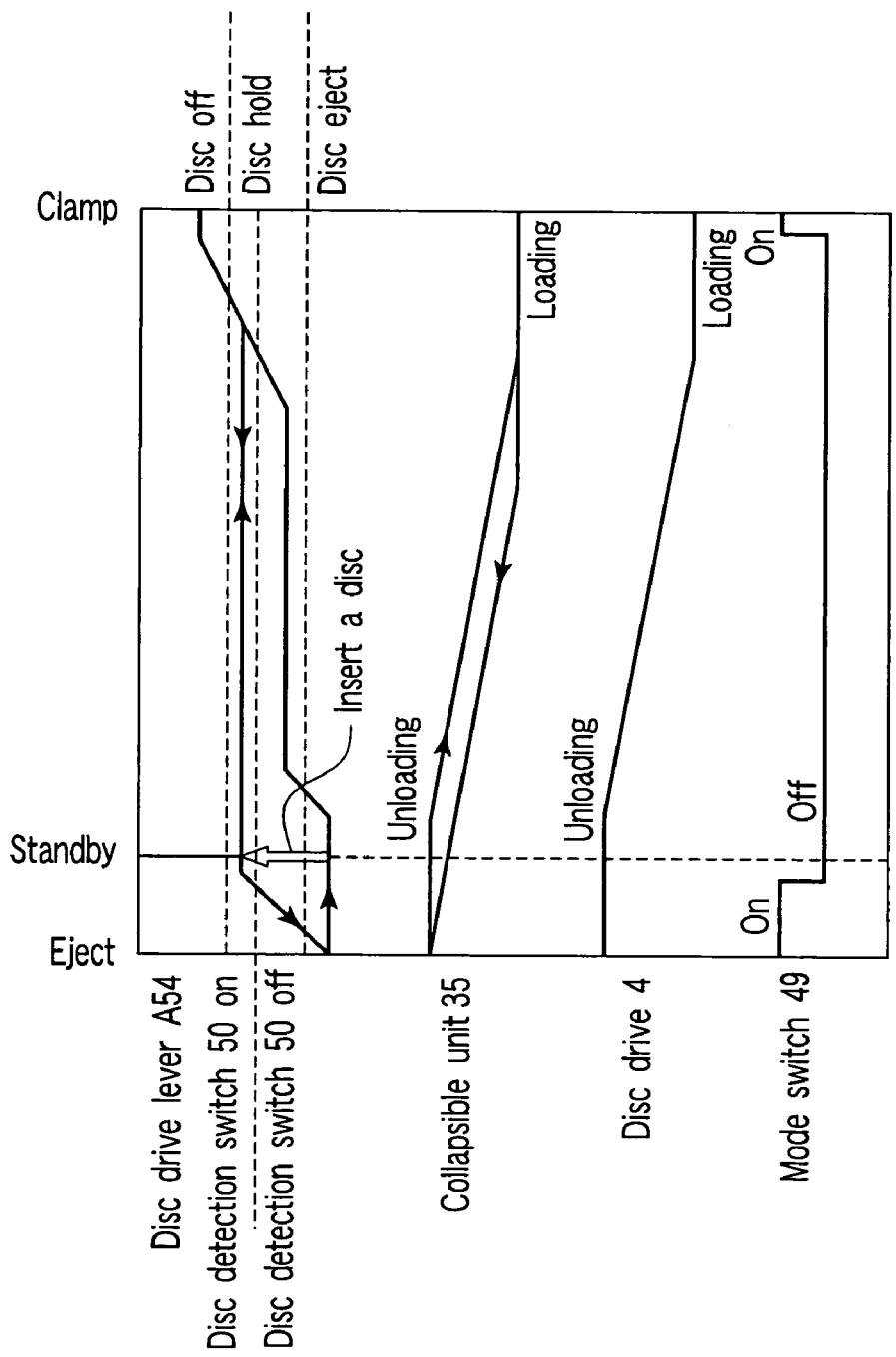
FIG. 17 is a timing chart explaining the transition of states accompanying with the movement of a cam slider in the disc drive apparatus.

FIG. 17 is a timing chart showing the transition of the states accompanying with the movement of the cam slider 47. As shown in FIGS. 16A and 16B, when the cam slider 47 is moved to the right in the standby state that the disc 23 can be inserted, a disc clamp sate is taken place. The cam

47b of the cam slider 47 for controlling the first disc drive lever 54 forms a wide cam groove while the collapsible unit 35 is expanding. When the disc 23 is displaced in the expanding direction A of the collapsible unit 35 while the collapsible unit 35 is expanding, a back disc lever 59 described later is rotated, and the rotation thereof is transmitted to a second disc drive lever 60 and the first disc drive lever, and the disc detection switch 50 is turned off. Thus, the expansion of the collapsible unit 35 can be stopped and the disc ejection mode can be taken place, to prevent a clamp error of the disc 23 in the disc drive section 4. This enhances the reliability of the disc drive apparatus.

By the shift to the clamp state, the first disc drive lever 54 shifts from the disc hold state to the disc off stage. By the shift from the standby state to the clamp state, the collapsible unit 34 shifts to the expanded state, and the disc drive section 4 moves in the expanding direction A of the collapsible unit 35 to align the rotation center of the disc drive motor 6 with the center of the disc 23.

When ejecting the disc 23 in the clamp state, the mode is shifted to the ejection state. This is done by the movement of the cam slider 47 to the left. The first disc drive lever 54, collapsible unit 35 and disc drive section 4 move reversely to the shift from the standby state to the clamp state. In this time, the cam slider 47 ejects the disc by a fixed amount to the expanding direction of the collapsible unit 35, when shifting from the standby state to the ejection state. This facilitates the removal of the disk 23. The ejection state is shifted to the standby state for insertion of the next disc.

The mode switch 49 is off in the standby state, and turns on before the clamp state. Thus, the mode motor 42 is braked, and stopped in the clamp state. When ejecting the disc 23, the mode motor 42 turns on after shifting to the ejection state from the standby state. Thus, the mode motor 42 is braked after certain time, stopped once in the ejection state, and returned sonly to the standby state. The mode switch is turned off, and the mode motor 42 is braked and stopped in the standby state.

Figure 18A:
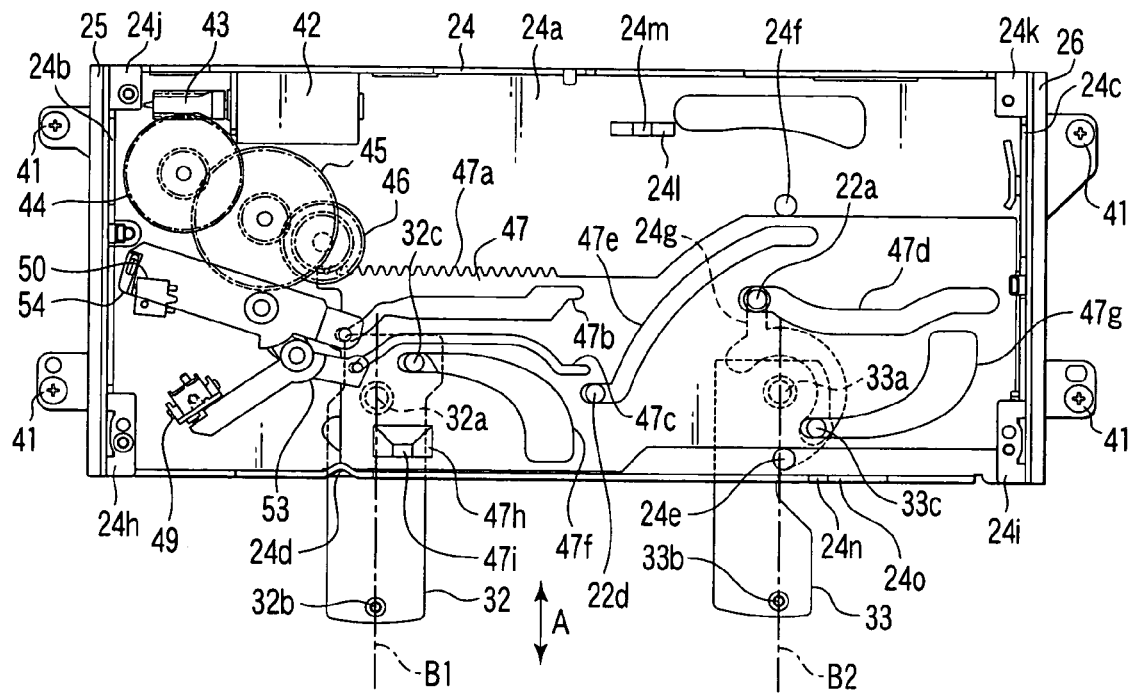
FIG. 18A is a plane view showing the clamp state of the disc drive.
Figure 18B:
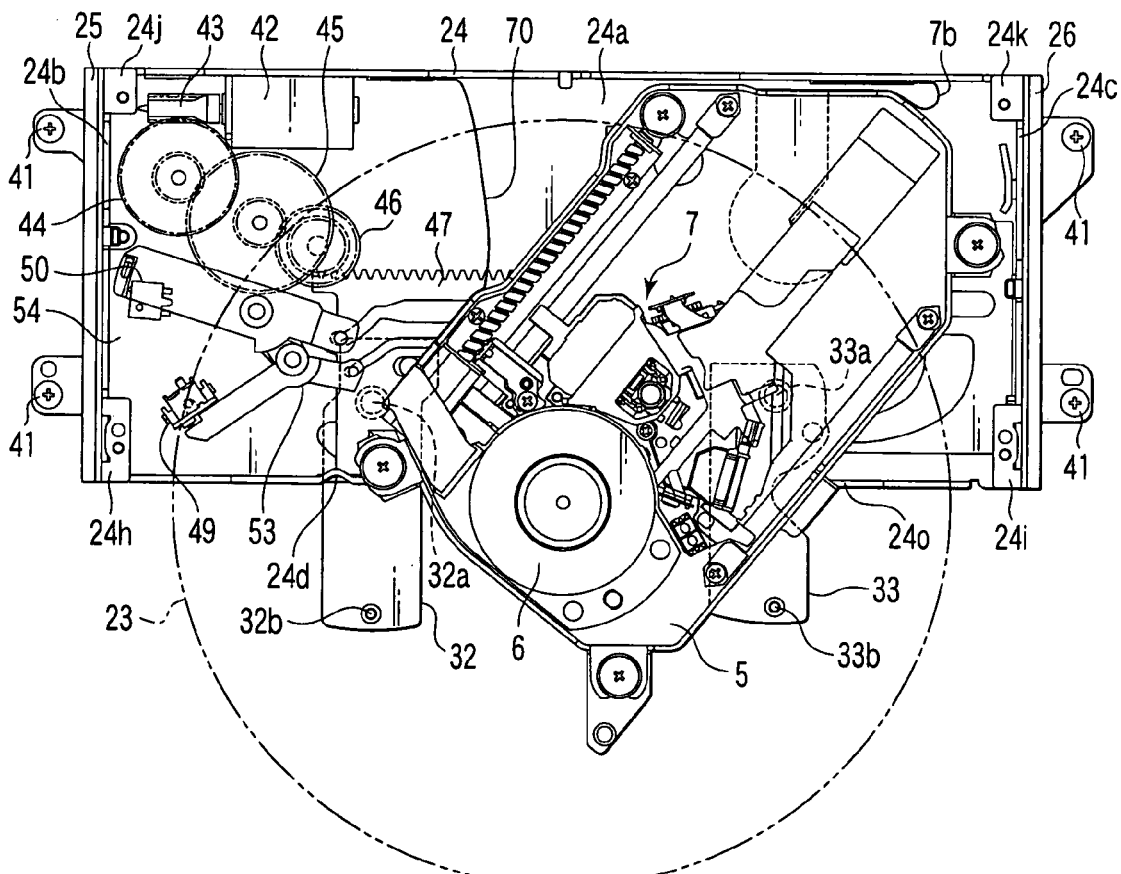
FIG. 18B is a plane view showing the clamp state of the disc drive.

FIG. 18A is a plane view of the drive on the base body 24 with the collapsible unit 35 expanded, showing the clamp state that a disc can be recorded and played back. FIG. 18B shows the state that the disc drive section 4 is mounted in FIG. 18A.

The switch lever 53 engages with the cam 47c of the cam slider 47, and the mode switch 49 is held on. The first disc drive lever 54 shifts from a disc hold state described later to a disc off state.

The disc drive section 4 moves and turns the collapsible unit 35 in the expanding direction A, and adjusts the center of rotation of the disc drive motor 6 displaced by a fixed amount from substantially the center of the lateral direction of the disc drive apparatus 2, to the center of rotation of the disc 23. Namely, the position of the disc 23 at which the disc detection switch 50 is switched when the disc is manually inserted is substantially the same as the position at which the disc 23 is loaded on the disc drive section 4. Therefore, a disc insertion mechanism for drawing in the disc 23 into the disc drive apparatus 2 is unnecessary, and a disc drive apparatus with a simple structure can be obtained.

In this time, a convex cam 24m of the fixed unit is formed in a predetermined height on the reference plane 24a of the base body 24, and a convex cam 24o of the fixed unit is formed in a predetermined height in the front bent part of the base body 24. In the clockwise direction of the boss 22a of the damper base 22, tapered parts 24l, 24n wand the convex cams 24m, 24o are moved down gradually to the reference plane 24a. At the operation position shown in FIG. 16B, the disc drive section 4 does not contact the convex cams 24m and 24o, but by the shift to the operation position shown in FIG. 18B, the disc drive section 4 is moved counterclockwise about the boss 22a of the damper base 22. Then, the contact pieces 22f and 22g of the damper base 22 shown in FIG. 5 are raised by the tapered part 24l and 24n, and rid on the convex cams 24m and 24o. As shown in FIG. 6, in the cam slider 47, the convex cam 47i provided in the cam member is formed to a predetermined height, and in the right direction of the drawing, the tapered part 47h and convex cam 47i are moved gradually to the reference plane 24a of the base body 24. In the operation state shown in FIG. 16B, the disc drive section 4 does not contact the convex cam 47i, but by the shift to the operation position shown in FIG. 18B, the contact piece 22h of the damper base 22 is raised by the tapered part 47h and rid on the convex cam 47i. Thus, the disc drive section 4 moves toward the disc 23 only in the clamp state, and reduces the difference between the height of disc insertion and the height of the disc drive motor 6 mounted on the turntable 6a. This improves the reliability of clamping and unclamping the disc 23.

As shown in FIGS. 18A and 18B, the left arm 32 and right arm 33 placed on the lower side of the reference plane 24a of the base body 24 are turned about 180° from the initial positions. In this time, the bosses 32b and 33b are positioned in the front direction, or in the front side of the display device 1, relative to the axes 32a and 33a of the left arm 32 and right arm 33. The collapsible unit 35 is expanded by this. In this state, the line B1 connecting the axis 32a of the left arm 32 to the boss 32b and the line B2 connecting the axis 33a of the right arm to the boss 33b are substantially parallel to the expanding/contracting direction A of the collapsible unit 35. Therefore, the left arm 32 and right arm 33 holds the collapsible unit 35 at the expanding position against an external force acting in the contracting direction of the collapsible unit 35. This enables to construct a lock device of the expansion/contraction mechanism.

In the clamp state, the FPC cable 7b of the optical pickup 7 is stuck to the side of the disc drive base 5, wound up on the side of the disc drive base 5, looped, extended to the left in FIG. 18B, and connected to the main substrate 39 placed on the lower side of the base body 24. The motor FPC cable 70 is stuck to the side of the disc drive base 5, opened the loop, extended upward in FIG. 18B, and connected to the main substrate 39 placed on the lower side of the base body 24. In all areas where the disc drive section 4 moves from the standby state to the clamp state, the FPC cable 7b and motor FPC cable 70 are placed to form a loop with the center substantially parallel to the rotation axis of the drive motor 6, and moved in a plane substantially parallel to the plane the disc drive section 4 moves. Therefore, a damage of the cable caused by the movement of the disc drive section 4 can be prevented, and at the same time, a disturbance of movement of the disc drive section 4 by the cables 7b and 70 can be prevented.

FIGS. 31A and 31B shows another embodiment of the FPC cable 7b of the optical pickup 7. The FPC cable 7b is bent partially along a bending portion 7h, forming a double sticking portion 7i.

In this embodiment, the sticking portion 7i is partially stuck to the side of the drive base 5, looped with the center almost parallel to the rotation axis of the disc drive motor 6, and the looped portion is doubled. By stacking two or more FPC cables, the width of the FPC cable in the direction almost parallel to the rotation axis of the disc drive motor 6 can be reduced. By giving a shielding material to FPC cables, degradation of a signal can be prevented. Therefore, a disc drive apparatus can be provided with a reliable flexible cable structure.

Figure 19A:
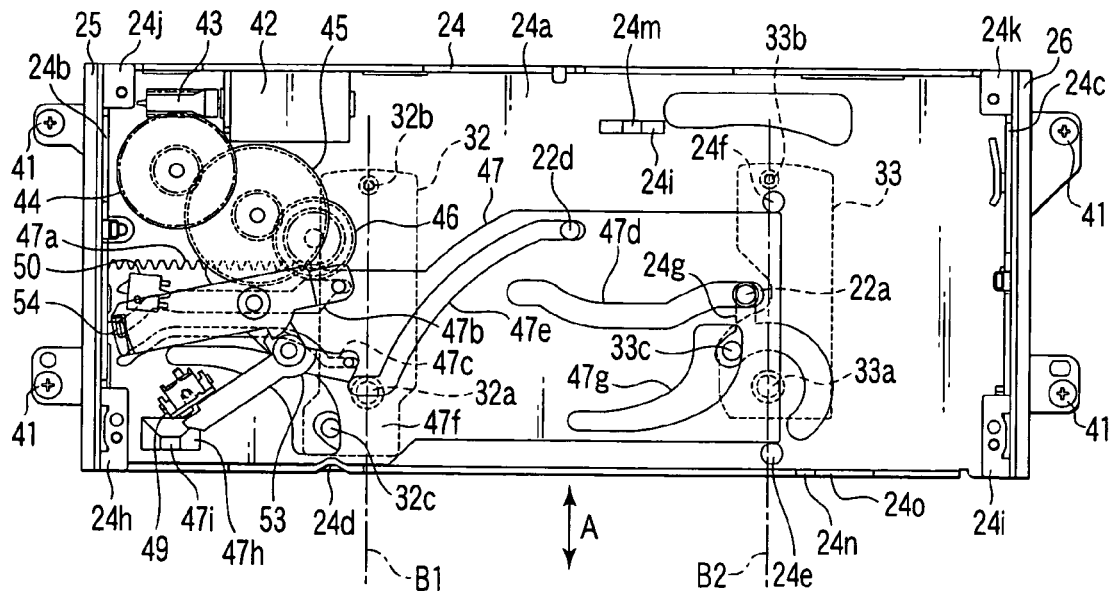
FIG. 19A is a plane view showing the ejection state of the disc drive in the disc drive apparatus.
Figure 19B:
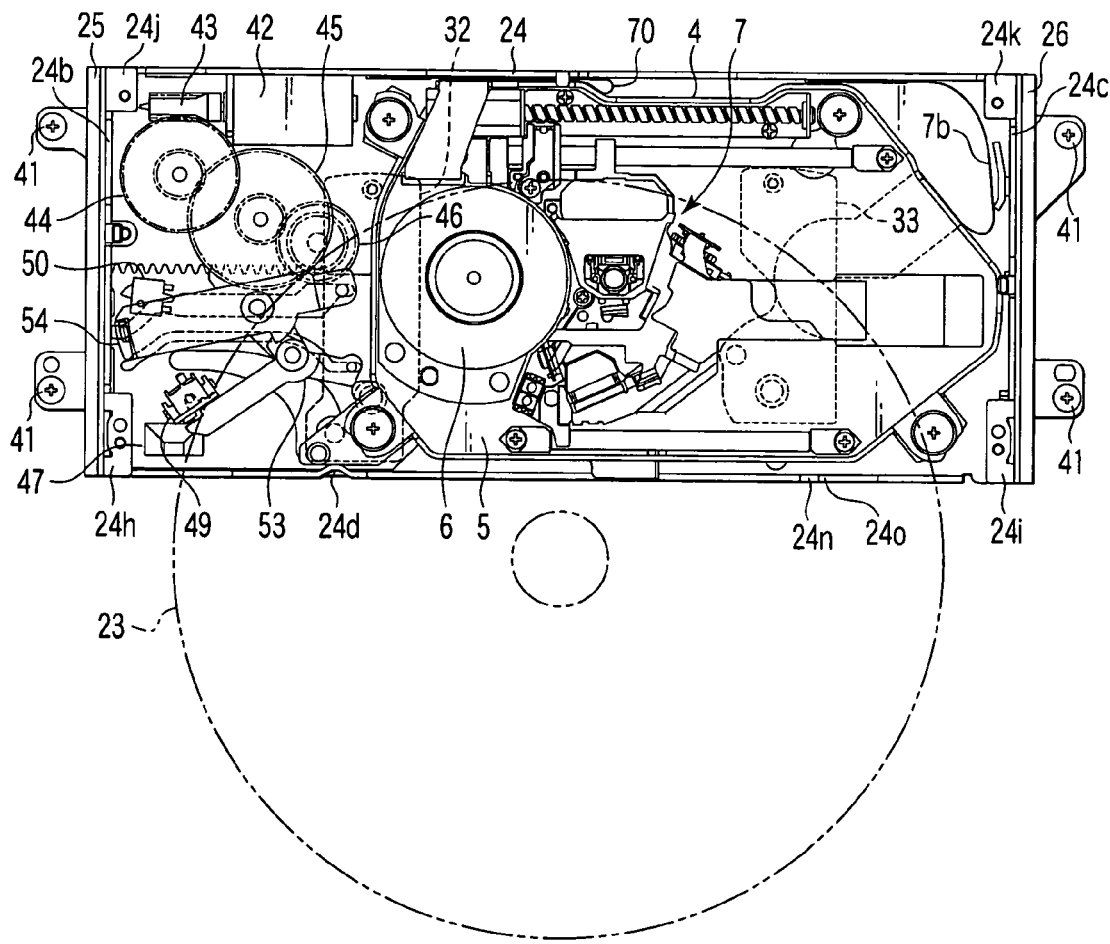
FIG. 19B is a plane view showing the ejection state of the disc drive in the disc drive apparatus.

FIGS. 19A and 19B are plane views of the drive portion on the base body 24. FIG. 19A shows the ejection state that the collapsible unit 35 is moved to the contracting position. FIG. 19B shows the state wherein the disc drive section 4 is mounted in FIG. 19A.

The switch lever 53 engages with the cam 47c of the cam slider 47, and the mode switch 49 is held on. The first disc drive lever 54 shifts from a disc hold state described later to a disc eject state. In this time, the disc detection switch 50 turns off, and after the disc drive sifts to the standby state, the next disc can be inserted. The disc drive section 4 moves to the contracting direction of the collapsible unit 35, and housed in the base body 24.

The left arm 32 and right arm 33 placed on the lower side of the reference plane 24a of the base body 24 are turned about 180° in the reverse direction from the clamp state to the standby state. With respect to the axes 32a and 33a of the left arm 32 and right arm 33, the bosses 32b and 33b are placed at the rear end of the fixed unit, to set the collapsible unit 35 in the contracted state. At the same time, the line B1 connecting the axis 32a of the left arm 32 to the boss 32b and the line B2 connecting the axis 33a of the right arm to the boss 33b are substantially parallel to the expanding/contracting direction A of the collapsible unit 35, to lock the collapsible unit 35 in the contracted state.

By the operations of the collapsible unit 35 shown in FIGS. 16A and 16B to FIGS. 19A and 19B, the collapsible unit 35 can be held in the contracting position covered by the fixed unit when unused, and the depth dimension of the disc drive apparatus 2 can be reduced. When the disc drive apparatus 2 is operated, the collapsible unit 35 is expanded to ensure a disk housing space, and the disc drive section 4 is moved to a driving position, and information can be read and written in the disc 23. This accelerates miniaturization with a simple structure, and provides a disc drive with good operability adequate to practical use.

Figure 20:
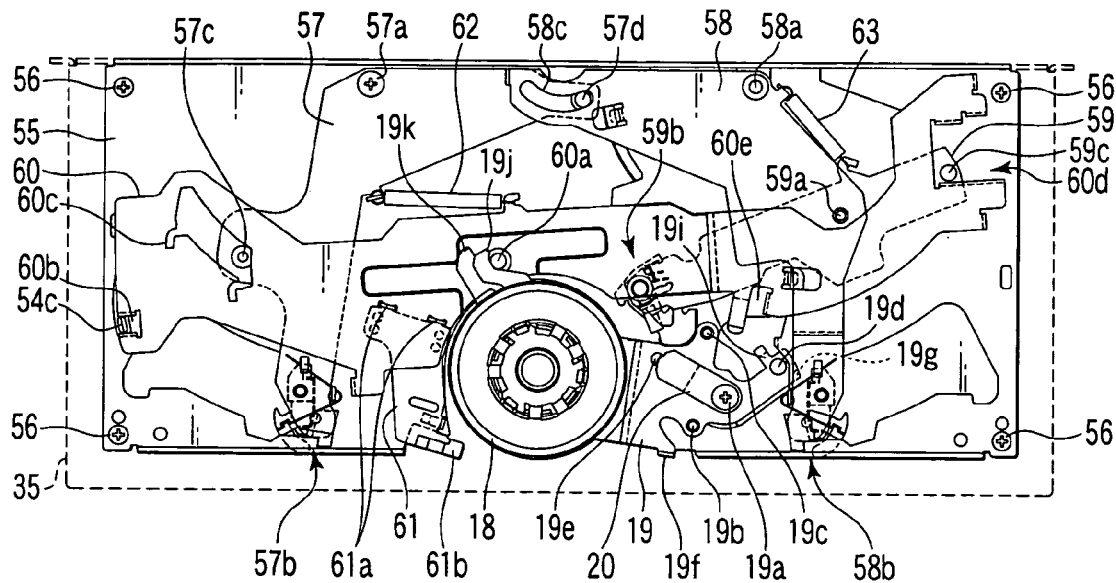
FIG. 20 is a plane view showing the standby state of the disc drive in the disc drive apparatus.

Next, explanation will be given on a disc loading mechanism to fit the disc 23 to the disc drive section 4. FIG. 20 shows a disc loading mechanism and a clamp member driving mechanism provided on the base top 55 of the base body 24. The base top 55 is formed as a substantially flat plate with substantially the same dimensions as the reference plane 24a of the base body 24. The base top 55 is fixed to the upper portions 24h, 24i, 24j and 24k of the left and right bent parts 24b and 24c with screws, and opposite substantially parallel to the reference plane 24a.

The disc loading mechanism has a left disc lever 57 and a right disc lever 58 for holding the disc 23 inserted from the disc insertion slot 3 of the collapsible unit 35. The left disc lever 57 has an axis 57a of rotational movement on the base top 55, and forms a disc holding part 57b in the direction to the front surface 2a of the disc drive apparatus 2. Pins 57c and 57d are fixed on the left disc lever 57.

The right disc lever 58 has an axis 58a of rotational movement on the base top 55, and forms a disc holding part 58b in the direction to the front surface 2a of the disc drive apparatus 2. A cam groove 58c is formed in the right disc lever 58. A pin 57d of the left disc lever 57 is always engaged with the cam groove 58c. Thus, the disc holding parts 58b and 58b of the left and right disc levers 57 and 58 are moved substantially symmetrically relative to the central part of the base top 55. The back disc lever 59 that is a disc holding member to hold the inserted disc 23 is specified rotatably about the axis 59a placed on the right disc lever 58, and a disc holding part 59b is formed at the end portion of the left side of the drawing and a pin 59c is formed at the end portion of the right side.

The left disc lever 57 and second disc drive lever 60 energize the disc holding part 57b by a tension spring 62, and the right disc lever and back disc lever 59 energize the disc holding parts 58b and 59b by a tension spring 63, so that the disc holding parts are turned to almost the center of the inserted disc 23. The left disc lever 57, right disc lever 58, back disc lever 59, second disc drive lever 60, and tension springs 62/63 form a disc loading mechanism.

FIG. 20 shows a standby state to enable insertion of a disc. When the disc 23 is inserted, the disc holding parts 571b, 58b and 59b are pushed by the outer edge of the disc 23 and moved.

Figure 25:
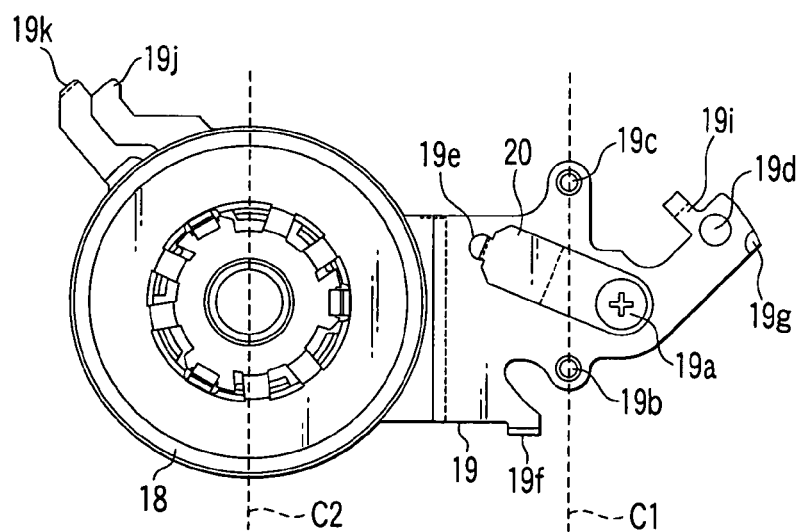
FIG. 25 is a plane view showing a clamp lever of the disc drive apparatus.

As shown in FIG. 20 and FIG. 25, a clamp lever 19 is provided at the center of the base top 55, and movable planar about the axis 19a. A clamp member 18 is rotatably fixed to one end of the clamp lever 19. The clamp lever 19 has projections 19b and 19c to engage with the base top 55. The clamp member 18 is movable vertically along the line C1 (FIG. 25) connecting the projections. A pin 19d is fixed to the clamp lever 19.

One end of an elastic spring member 20 is rotatably fixed to the axis 19a of the clamp lever 19. The other end of the spring member 20 is engaged with a hole 19e formed in the clamp lever 19. Thus, the spring member 20 is elastically urged to move the clamp member 18 downward.

The second disc drive lever 60 has an axis 60a of rotational movement on the base top 55, and has a groove 60b engaged with the boss 54c of the first disc drive lever 54, a cam groove 60c to drive the pin 57c of the left disc lever 57, a groove 60d to engage with the pin 59c of the back disc lever 59, and a cam groove 60e to drive the pin 19d of the clamp lever 19. A third disc drive lever 61 is fixed to the second disc driver lever 60. The third disc drive lever 61 has a bent part 61a engaged with the second disc drive lever 60, and a cam 61b provided at the distal end. The cam 61b is movable vertically about the bent part 61a.

Figure 22A:
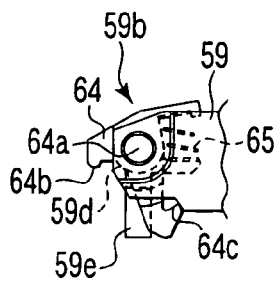
FIGS. 22A, 22B, 22C and 22D show the different operation states of a disc holding unit at the distal end of a back disc lever in the disc drive.
Figure 22B:
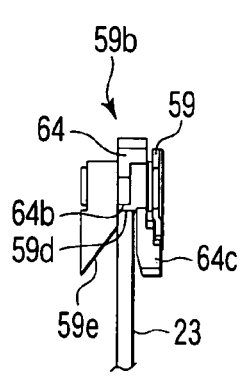

FIGS. 22A and 22B are plane view and side view of the disc holding part 59b provided at the distal end of the back disc lever 59. The disc holding part 59b has a regular contact piece 59d that is a first contact piece to contact the outer edge of the disc 23, a tapered part 59e to raise the disc lowered by fixed amount up to the regular contact piece 59 to eject the disc, a back detection lever 64 that is a disc detection member, and a spring 65 that is a spring member. The back detection lever 64 has an axis 64a of rotational movement at the distal end of the back disc lever 59, a disc rim contact piece 64b that is a second contact piece to contact the outer edge of the disc 23, and a lock piece 64c. The back detection lever 64 is urged by the spring 65, so that the disc rim contact piece 64b is moved rotationally in the counterclockwise direction toward the disc center.

Figure 22C:
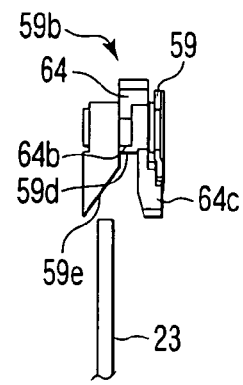
Figure 22D:
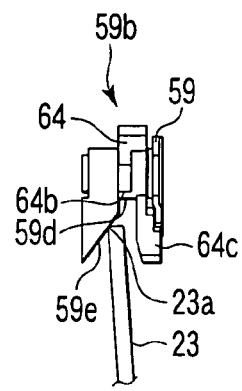

FIG. 22B shows the relation between the disk holding part 59b of back disc lever 59 and the disk 23 in the standby and ejection states. FIG. 22C shows the relation between the disc holding part 59b and the disc 23 in the clamp state. Namely, in FIG. 22B, the disc 23 contacts the regular contact piece 59d in the upper direction, the right of the tapered part 59e in the drawing. In FIG. 22, the disc 23 is located at the position of the disc drive motor 6 lowered by a fixed amount to the left in the drawing, and the disc holding part 59b is driven toward the disc rim not to prevent rotation of the disc 23. When the clamp state is shifted to the ejected state, the disc holding part 59b is driven toward the inner circumference of the disc, and raises the disc 23 by the tapered part 59e and brings the disc into contact with the regular contact piece 59d.

The disc holding parts 57b and 58b of the left disc lever 57 and right disc lever 58 have substantially the same structure and function as the disc holding part 59b at the distal end of the back disc lever 59.

Figure 21:
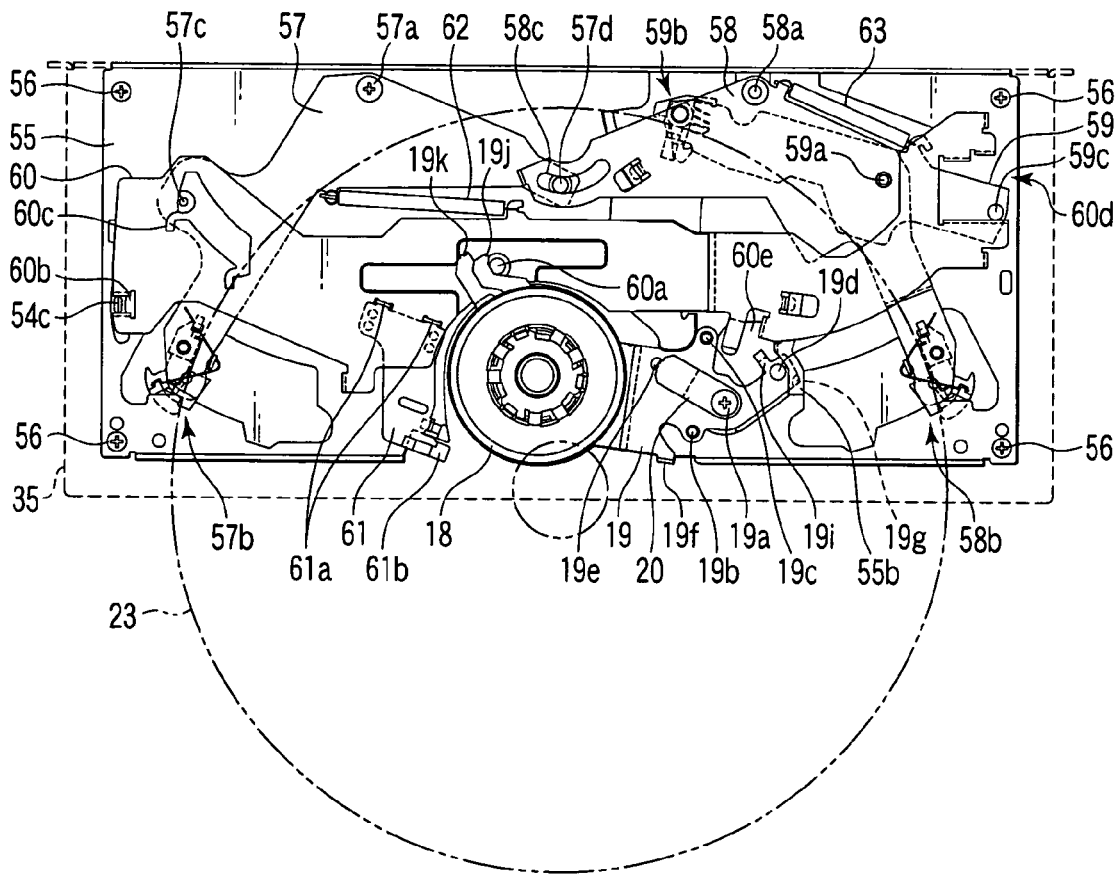
FIG. 21 is a plane view showing the standby state of the disc drive in the disc drive apparatus.

FIG. 21 shows the standby state with the disc 23 inserted. When the disc 23 is inserted, the disc holding parts 57b and 58b of the left and right disc levers 57 and 58 are pushed by the rim of the disc and moved to the outer circumference of the disc. The back disc lever 59 is moved rotationally together with the right disc lever 58, and positioned to the state that the disc holding part 59*b* contacts the rim of the disc 23. By the movement of the back disc lever 59, the pin 59*c* is driven to push in the groove 60*d* of the second disc drive lever 60. Then, in FIG. 20, the second disc drive lever 60 is turned clockwise to drive the boss 54*c* of the first disc drive lever 54. Thus, the first disc drive lever 54 is moved to a predetermined angle position and turns on the disc detection switch 50, as shown in FIG. 16A. By the switching of the disc detection switch 50, the insertion of the disc 23 into the correct position is detected, and the mode motor 42 is rotated to shift to the clamp state. This makes it possible to provide a disc drive apparatus with good operability capable of recording and playback simply by inserting the disc 23.

When a disc is inserted in being inclined by forcibly lowering a disc insertion end 23*a*, the disc end 23*a* touches the tapered part 59*e* of the back disc lever 59. If the disc 23 is pushed into in this state, the back disc lever 59 is moved, the first disc drive lever 54 is moved to a predetermined angle position and turns on the disc detection switch 50, before the disc is inserted into a correct position, and the disc detection switch 50 may be turned on. If the mode motor 42 is rotated to shift to the clamp state by switching the disc detection switch 50, the disc, turntable 6*a* and clamp member 18 may not be correctly clamped.

Figure 23A:
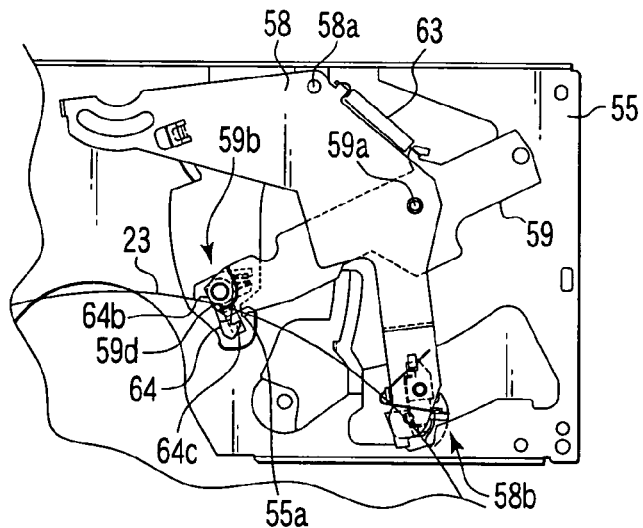
FIGS. 23A and 23B show the different operation states of a back disc lever in the disc drive apparatus.
Figure 23B:
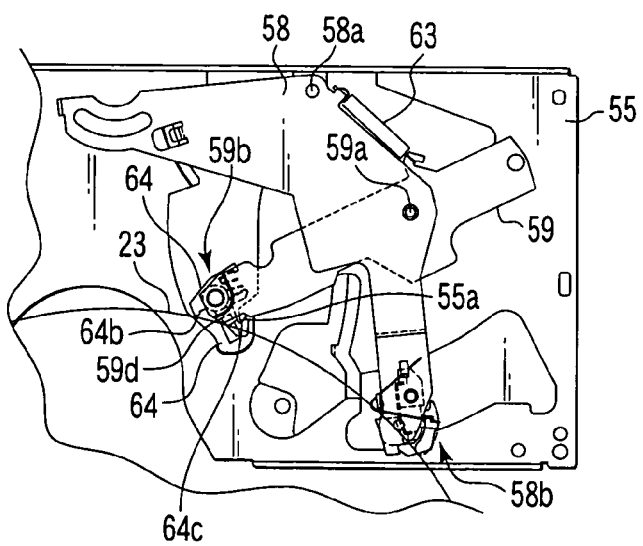

FIG. 23A shows the relation between the back detection lever 64 and the lock piece 55*a* of the base top 55 on the way of inserting a disc at a correct position shown in FIG. 22B. FIG. 23B shows the relation between the back detection lever 64 and the lock piece 55*a* of the base top 55 on the way of inserting a disc by inclining the disc insertion end 23*a* shown in FIG. 22D. In FIG. 23A, the disc 23 contacts the regular contact piece 59*d*. In this time, the disc rim contact piece 64*b* of the back detection lever 64 is pushed by the disc 23, and move to the position where the lock piece 64*c* does not engage with the lock piece 55*a* of the base top 55 that is a lock member. Thus, the disc 23 can be correctly inserted by being inserted furthermore, as shown in FIG. 21.

In FIG. 23B, the disc 23 contacts the tapered part 59*e* of the disc holding part 59*b*. In this time, the disc rim contact piece 64*b* of the back detection lever 64 is not sufficiently pushed by the disc 23, and not moved to the position where the lock piece 64*c* does not engage with the lock piece 55*a* of the base tope 55. Thus, the disc holding part 59*b* of the back disc lever 59 is stopped to prevent further insertion of the disc when the disc insertion end 23*a* is forcibly lowered. This prevents that the disc detection switch 50 is turned on before the disc 23 is inserted to the correct position, and the disc 23, turntable 6*a* and clamp member 18 are not correctly clamped. Therefore, a reliable disc drive apparatus can be provided. When the disc is pushed in the state shown in FIG. 23, the disc insertion end 23*a* is raised to the upper right in the drawing along the tapered part 59*e* of the back disc lever 59, and the disc 23 comes in contact with the regular contact piece 59*d*. Therefore, the disc can be correctly inserted.

Figure 24:
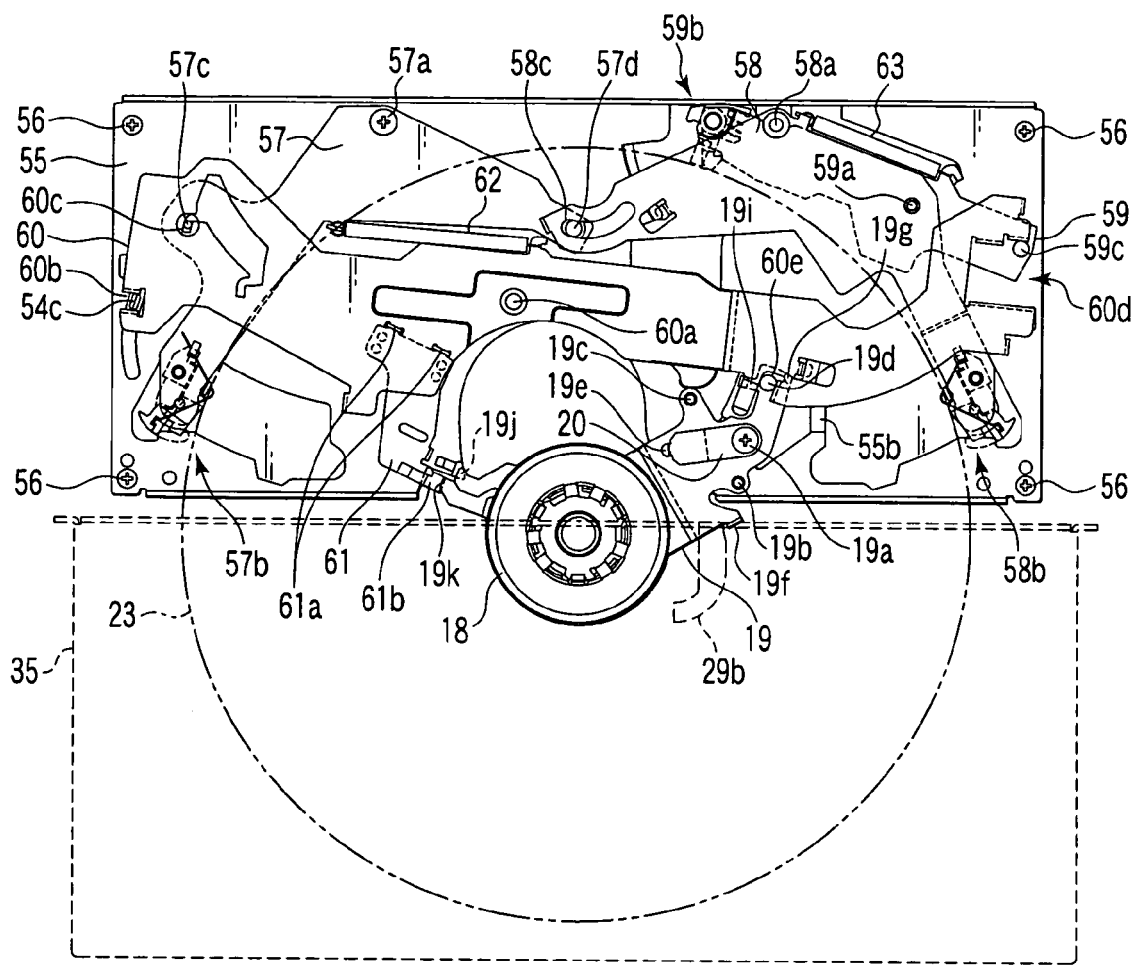
FIG. 24 is a plane view showing the clamp state of the disc drive in the disc drive apparatus.

FIG. 24 shows the state that the disc 23 is clamped by the disc loading mechanism and clamp member driving mechanism. In this time, the first disc drive lever 54 is turned clockwise, and the second disc drive lever 60 is turned clockwise. Thus, the pin 57*c* of the left disc lever 57 is driven by the cam groove 60*c* of the second disc drive lever 60, and the left disc lever 57 is moved in the direction that the disc holding part 57*b* is separated from the disc 23. The right disc lever 58 is moved synchronizing with the left disc lever 57 in the direction that the disc holding part 58*b* is separated from the disc 23.

The back disc lever 59 is moved together with the right disc lever 58, and when the pin 59*c* is pushed into the groove 60*d* of the second disc drive lever 60, the disc holding part 96*b* is moved in the direction of separate from the disc 23. Thus, the disc holding parts 57*b*, 58*b* and 59*b* do not disturb the rotation of the disc mounted on the disc drive motor 6.

The cam 29*b* provided on the rear side of the plate member forming the upper side of the front top 29 pushes a projection 19*f* of the clamp lever 19 by the movement of the front top 29 in the expanding direction A, and moves rotationally the clamp lever 19 on a plane about the axis 19*a*. Thus, the pin 19*d* of the clamp lever 19 engages with the cam groove 60*e* of the second disc drive lever 60.

Figure 26A:
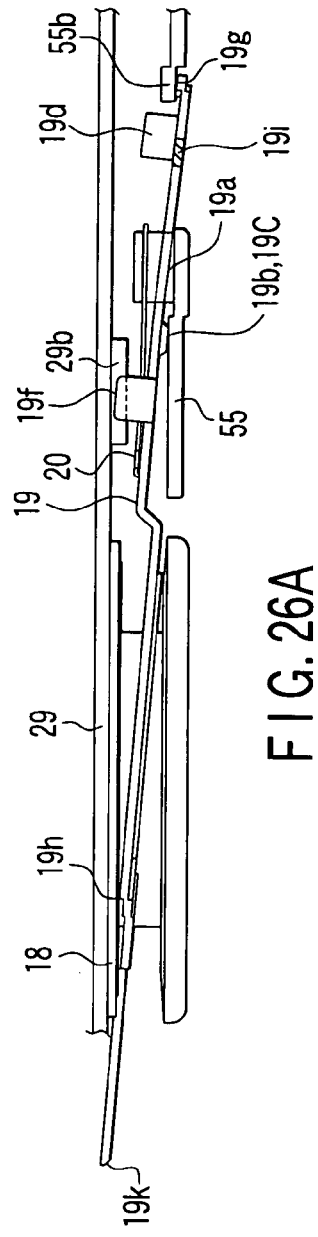
FIGS. 26A, 26B and 26C are sectional views explaining the different operation states of the clamp lever of the disc drive apparatus.
Figure 26B:
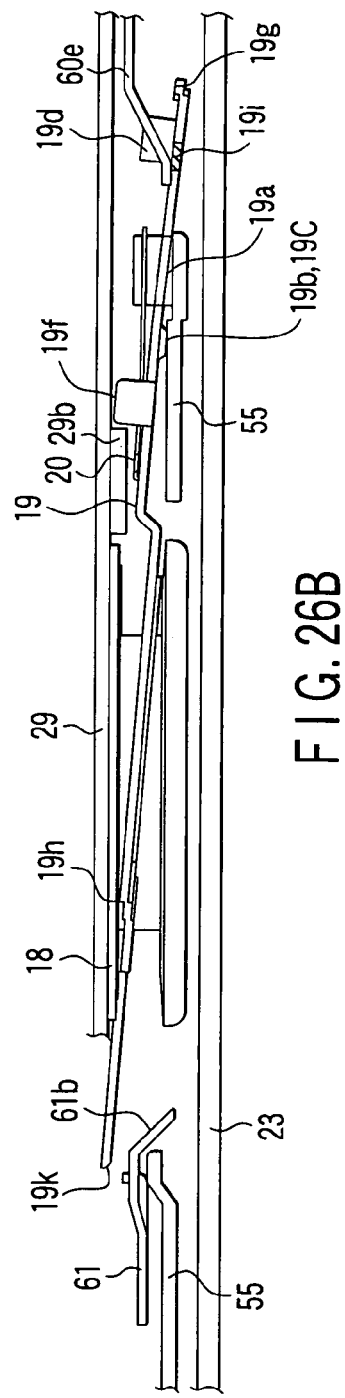
Figure 26C:
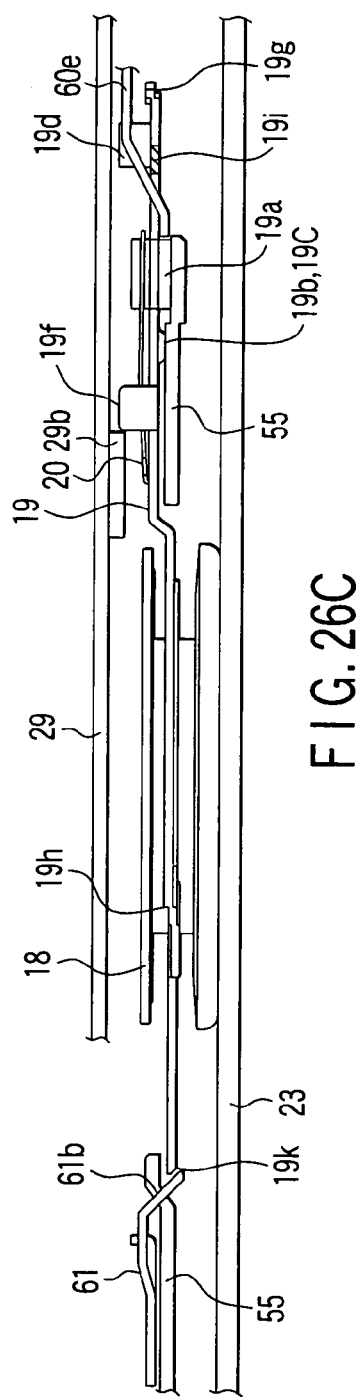

The clamp member driving mechanism will be further explained. FIG. 25 is a plane view of the clamp lever 19. FIGS. 26A, 26B and 26C are schematic diagrams for explaining the operations of the clamp member driving mechanism. FIG. 26A shows the standby state corresponding to FIG. 21. FIG. 26C shows the clamp state corresponding to FIG. 24. FIG. 26B shows the middle state between FIG. 26A and FIG. 26C.

The third disc drive lever 61 is a clamp lever drive. The third disc drive lever 61 and clamp lever 19 constitute the clamp member driving mechanism. In FIG. 26A and FIG. 21, the clamp lever 19 is pushed into a front lever 66 described later, and positioned within the contour of the base top 55. In this time, the clamp lever 19 contact the upper side of the base top 55 by the projections 19*b* and 19*c*, and the projection 19*g* contacts the rear side of the cam 55*b* of the base top 55. The contact piece 19*h* of the clamp lever 19 raise the clamp member 18 upward. Thus, the clamp member 18 is pressed to the front top 29 of the collapsible unit 35.

In FIG. 26C, when the collapsible unit 35 is expanded, the cam 29*b* of the front top 29 pushes the projection 19*f* of the clamp lever 19, and the clamp lever 19 moves rotationally on a plane about the axis 19*a*. By this rotational movement, a suction part 19*i* of the clamp lever 19 goes under the cam groove 60*e* of the second disc drive lever 60, and the pin 19*d* can engage with the cam groove 60*e* of the second disc drive lever 60. In this time, the cam 55*b* controlling the projection 19*g* is not formed on the projection 19*g*, and the projection 19*g* is allowed to rise after the shift to the next state of FIG. 26C.

In FIG. 26C and FIG. 24, the second disc drive lever 60 shifts to the clamp state. In this time, by the rotational movement of the second disc drive lever 60, the cam groove 60*e* shifts to the left and releases the push of the suction part 19*i* of the clamp lever 19. Thus, the clamp lever 19 is moved rotationally about the line C1 connecting the projections 19*b* and 19*c*, by the force of the spring member 20, and stopped when a receiving part 19*j* contacts the base top 55. In this time, the clamp member 18 sets the disc 23 on the disc drive motor 6, so that the rotation of disc is not disturbed by the clamp lever 19.

The unclamping operation to release the clamp member 18 from the disc 23 in the clamp state of FIG. 26C operates the second disc drive lever 60 reversely, and goes to the state of FIG. 26B. In this time, the clamp member 18 sets the disc 23 on the disc drive motor 6 by the strong magnetic force of a built-in magnet. Thus, the unclamping operation is difficult only by pushing the suction part 19*i* of the clamp lever 19 by the cam groove 602 of the second disc drive lever 60. It merely bends the second disc drive lever 60 and clamp lever 19. Therefore, as shown in FIG. 25, the clamp lever 19 has an axis of rotational movement along the line C1 connecting the projections 19*b* and 19*c* to move the clamp member 18 in the direction of disc rotation axis, and has a distal end 19*k* that is a contact piece to the third disc drive lever 61 on the opposite side of the axis C1 with respect to the line C2 parallel to the axis C1 passing through the rotation axis of the clamp member 18. The cam 61*b* is provided at the distal end of the third disc drive lever 61 that is a clamp lever drive, and the clamp state is released by the distal end of the third disc drive lever 61 in the unclamping operation. Thus, the clamp lever 19 is moved rotationally outside the rotation axis of the damper with respect to the fulcrum that is the rotation axis. This can decrease the driving force to raise the clamp member 18 from the disc drive motor 6 when ejecting a disk, and make it easy to ensure the strength and the driving force of the clamp lever 19. As a result, a reliable disc clamp device can be provided.

Figure 27:
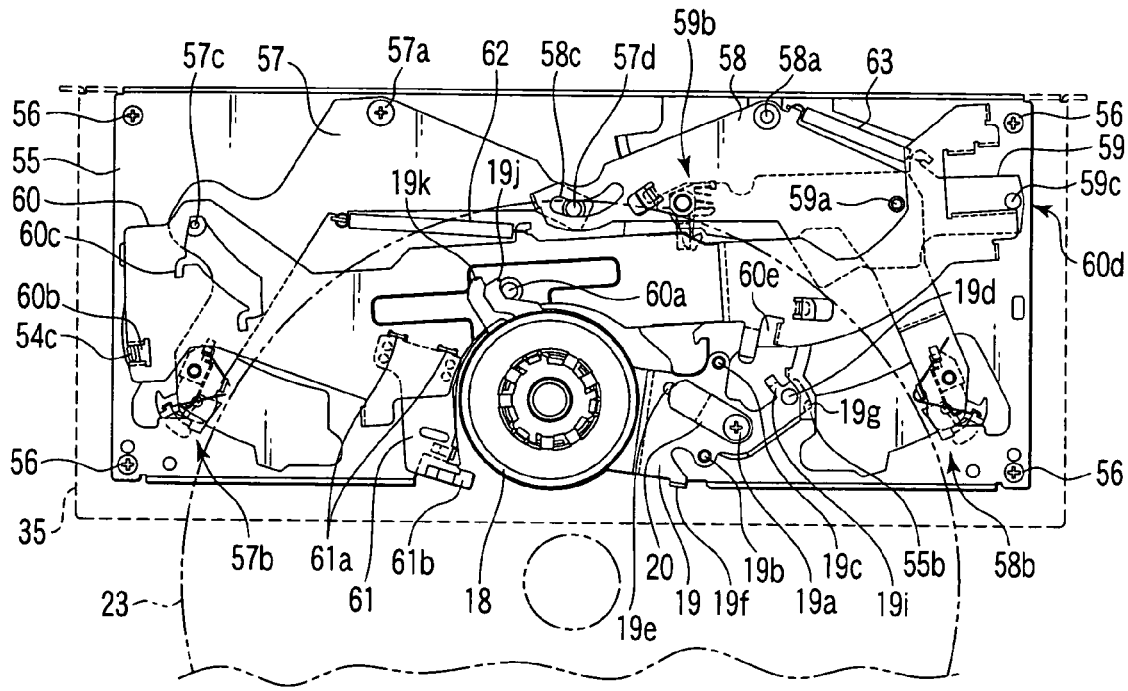
FIG. 27 is plane view showing the eject operations of the disc drive in the disc drive apparatus.

FIG. 27 shows the eject state to eject a disc in the disc loading mechanism and clamp member driving mechanism. The first disc drive lever 54 and second disc drive lever 60 are turned counterclockwise. The pin 59c of the back disc lever 59 is pushed into the groove 60d of the second disc drive lever 60, and the disc holding part 59b is moved rotationally in the direction of ejecting the disc 23. This facilitates removal of the disc 23. When inserting again the ejected disc 23, simply push the disc. The disc can be inserted.

By the operations when in FIG. 20 to FIG. 27, the clamp lever 19 provided with the clamp member 18 can be moved, and the depth dimension of the disc drive apparatus 2 can be reduced when unused. At the same time, when the disc drive apparatus 2 is used, the collapsible unit 35 expands to ensure the disc 23 housing space, the disc loading mechanism loads the disc 23 at a predetermined position, and the clamp member driving mechanism holds the disc securely on the turntable. This accelerates miniaturization with a simple structure, and provides a practical disc drive apparatus with good operability.

Figure 28:
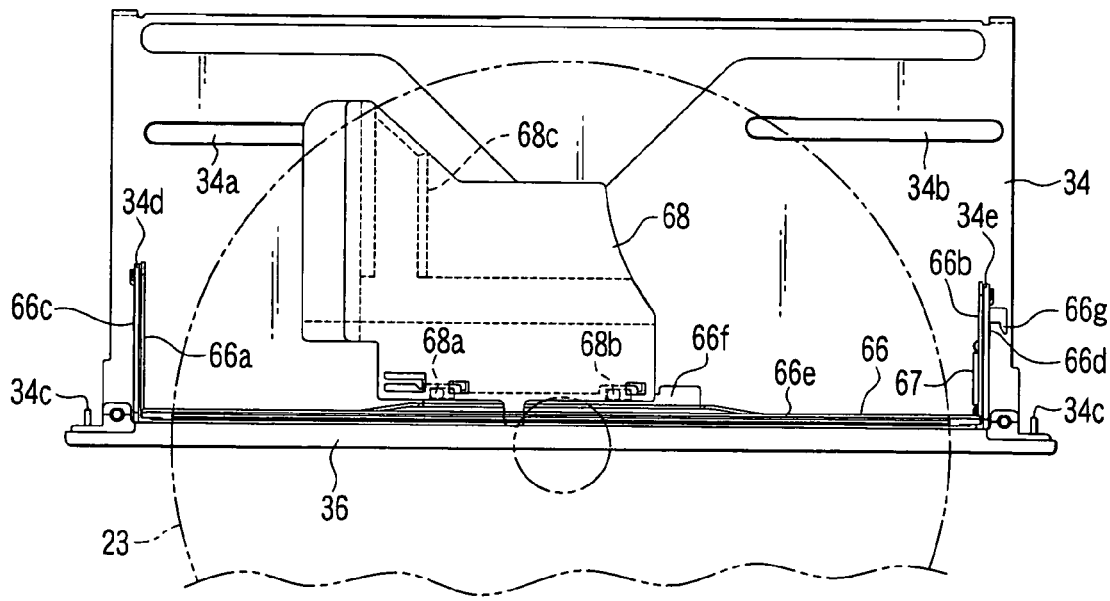
FIG. 28 is a plane view of a collapsible unit in the disc drive apparatus partially broken away.
Figure 29A:
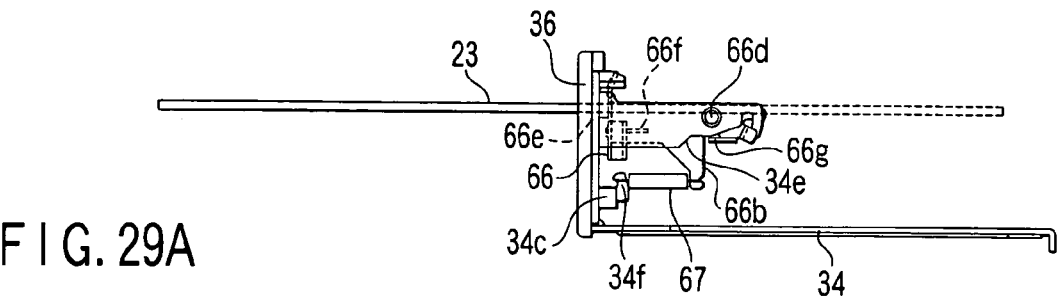
FIGS. 29A, 29B, 29C, 29D and 29E are views showing the operations of the essential portions of the collapsible unit in the disc drive apparatus.
Figure 29B:
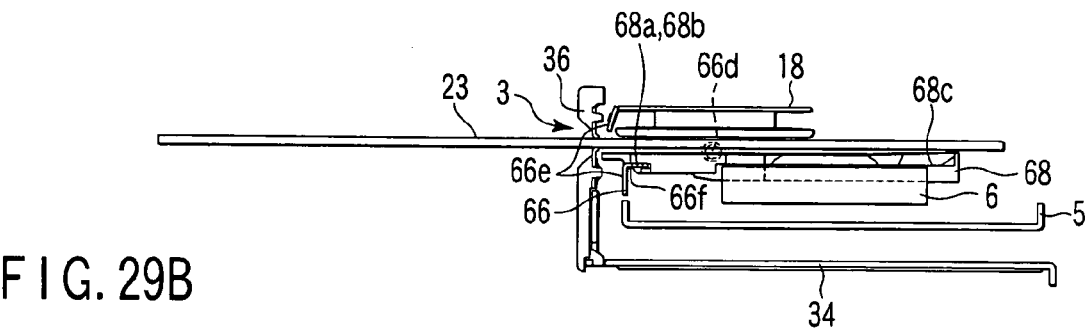
Figure 29C:
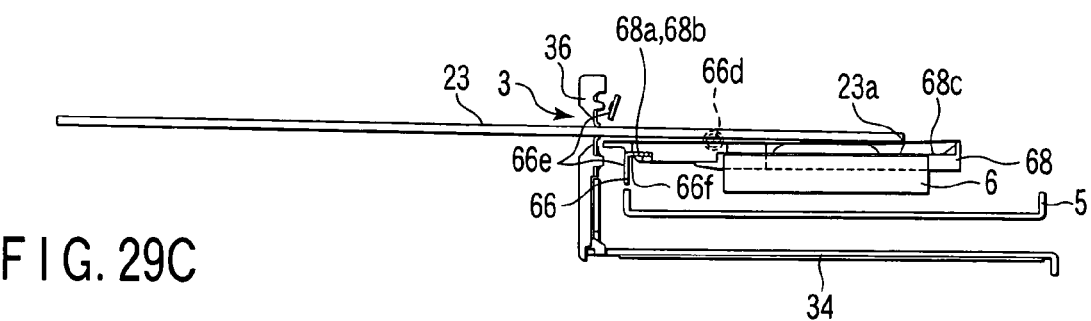

Next, detailed explanation will be given on the disc guide member and disc guide lever 68. FIG. 28 is a plane view of the collapsible unit 35 with the front top 29 removed. FIG. 29A is a right side view of the collapsible unit with the disc guide lever 68 removed. FIG. 29B is a right side view of the central cross section of FIG. 28 of the collapsible unit with the disc guide lever 68 fixed, showing schematically the disc drive base 5 and disc drive motor 6 of the disc drive section 4. FIG. 29C is a right side view of the central cross section of FIG. 28 of the collapsible unit, showing a state wherein a disc is inserted with being inclined. The front bottom 34 has arms 34d and 34e extending from the front to the back. These arms are provided on the left and right outsides of the disc insertion slot 3. The front lever 66 is provided to bride the arms 34d and 34e. The front lever 66 has axes 66c and 66d of rotational movement in the lever 66a and 66b opposite to the arms 34d and 34e, and has a front part 66e forming an opening larger than the disc insertion slot 3 extending between the levers 66a and 66b. The front lever 66 is provided rotatably about the straight line connecting the axes 66c and 66d. A tension spring 67 is provided between the lever 66b and a hook 34f formed in the front side of the front bottom 34, and energizes the front part 66e of the front lever 66 in the upper left direction of the drawing. Thus, the front lever 66 contacts the rear side of a plate member forming the upper side of the not-shown front top 29, and stops there.

Figure 30A:
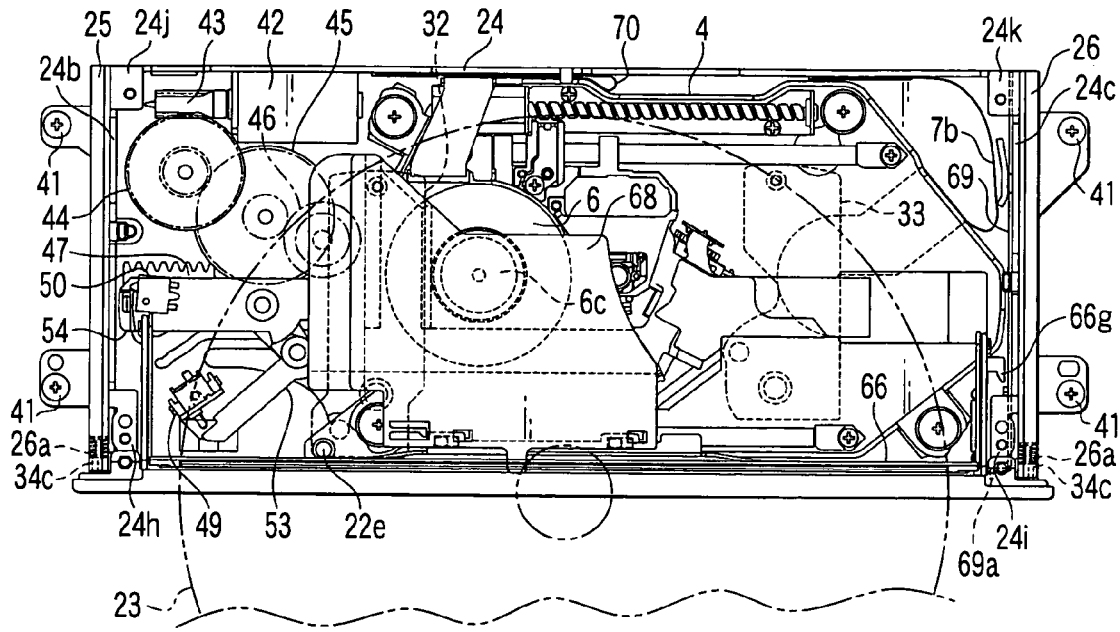
FIGS. 30A and 30B are plane views showing the different operation states of the disc drive in the disc drive apparatus.

The disc guide lever 68 that is a disc guide member has axes 68a and 68b of rotational movement. These axes 68a and 68b are provided in a bent part 66f of the opening under the front part 66e of the front lever 66. The front lever 66 is provided rotationally about the straight line connecting the axes 68a and 68b. The upper side shown in FIG. 28 is substantially plane and shaped partially projecting over the contour of the inserted disc 23, and has a cam 68c on the rear side. The disc guide lever 68 is placed between the disc 23 and disc drive motor 6, as shown in FIG. 29B. FIG. 30A shows the standby state a disc can be inserted, by adding a plane view with the front top 29 removed from the collapsible unit 35 of FIG. 28 to FIG. 16B. In the state shown in FIG. 16B, when a disc is inserted by forcibly lowering and inclining the disc insertion end 23a, the recording surface of the disc 23 may contact the disc drive motor 6. In the state shown in FIG. 30A provided with the disc guide lever 68, when a disc is inserted by forcibly lowering and inclining the disc insertion end 23a, the outer edge of the disc insertion end 23a touches the disc guide lever 68 as shown in FIG. 29C, protecting the recording surface of the disc against the disc drive motor 6. Therefore, a reliable disc drive apparatus protecting a disc surface can be provided.

Figure 29D:
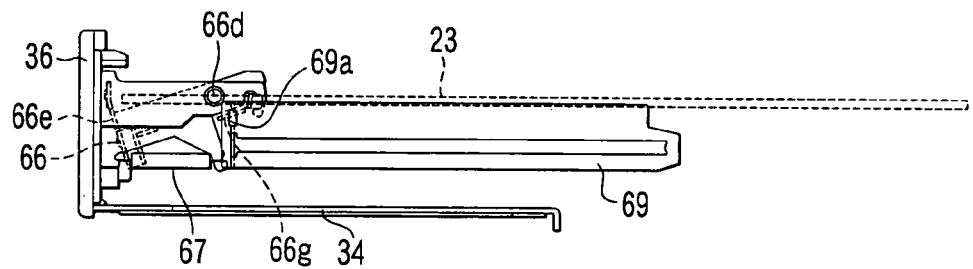
Figure 29E:
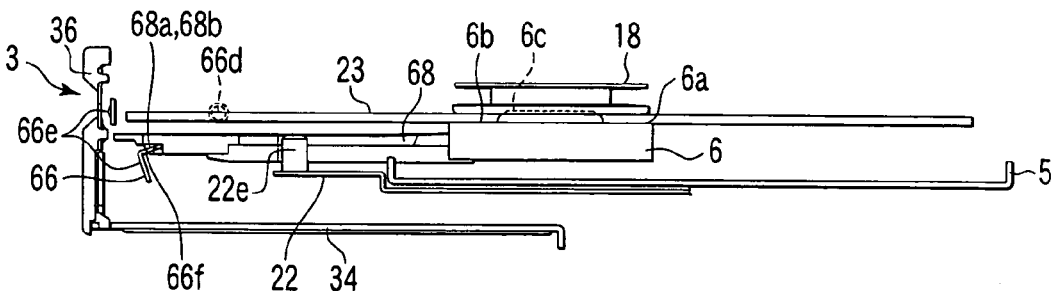
Figure 30B:
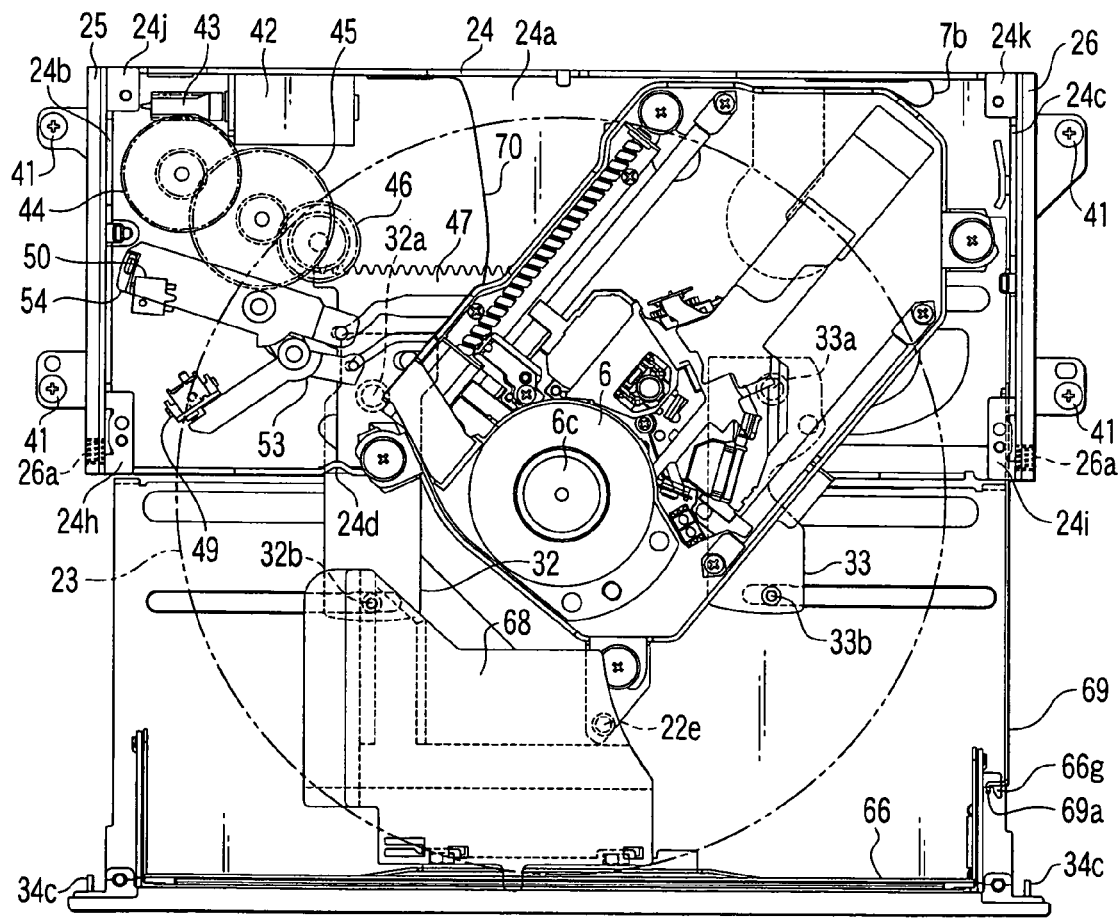

FIG. 29D shows the rotational movement of the front lever 66 in the state that the collapsible unit 35 expands from the contracted state of FIG. 29A. FIG. 29E schematically shows the movement of the disc lever guide 68 fixed to the front lever 66, and the disc drive base 5, disc drive motor 6 and boss 22e of damper base 22, in the state that the collapsible 35 expands from the contracted state of FIG. 29B. FIG. 30B shows the clamp state of FIG. 18B, by adding a plane view with the front top 29 removed from the collapsible unit 35 of FIG. 28. Inside of a right bent part 24c of the base body 24, a connection slider 69 is provided slidable in the contracting direction A of the collapsible unit 35. On the way that the collapsible unit 35 expands, a hook 66g of the lever 66b of the front lever 66 engages with a lock piece 69a of the connection slider 69. Before the collapsible unit reaches the specified expansion distance, the connection slider 69 reaches the not-shown rest of the right bent part 24c, and halts there, and stops the movement of the hook 66g of the lever 66b of the front lever 66. When the collapsible unit 35 moves further from the position before the specified expansion point to the expansion complete position, the axis 66d of the front lever 66 moved together with the collapsible unit 35 is shifted, and the front part 66e of the front lever 66 is moved downward in the drawing. This ensures a space that the axes 68a and 68b of the disc guide lever 68 do not disturb the rotation of the disc 23 lowered by predetermined amount in the clamp state. The disc guide lever 68 provided on the disc drive motor 6, in the state shown in FIG. 30A, is moved to the outside of the disc drive motor 6 in the clamp state, as shown in FIG. 30B. In FIG. 30E, by receiving the disc guide lever 68 with the boss 22e of the damper base 22 set lower in the drawing than the disc mounting surface 6b of the turntable 6a, a space is ensured so that the whole area of the disc guide lever 68 does not disturb the rotation of the disc 23 lowered by a predetermined amount in the clamp state. During the expansion of the collapsible unit 35, the disc guide lever 68 is received by any one of the boss 22e of the damper base 22 and the positioning part 6c of the turntable 6a, and transferred by the cam 68c provided on the rear side.

During the shift from the expanded state to the contracted state, FIG. 29E to FIG. 29B, the front part 66e of the front lever 66 slides and pushes in the clamp member 18. In the standby state, the clamp lever 19 is positioned within the contour of the base top 55.

In FIG. 29B, the vertical height of the disc guide lever 68 on the side of the insertion slot 3 in the contracted state is at the position separated predetermined amount from a disk to be inserted. Therefore, if a different shape disc is inserted, the disc can be received by the disc guide lever 68 and ejected from the disc insertion slot 3 when the collapsible unit is changed from the expanded state to the contracted state and the disc is ejected.

With the configuration of the disc drive apparatus 2 as explained above, the apparatus can be made very compact with a simple structure and can be mounted in the flat-type display device 1. The apparatus is given practicability, good operability and reliability. At the same time, a flat-type display device with a built-in compact disc drive apparatus can be obtained.

According to the above embodiment, a disc drive apparatus includes a fixed unit and a collapsible unit. The collapsible unit is held movable to the fixed unit, and driven by an expansion/contraction mechanism to be expanded and contracted to the fixed unit. A disc insertion slot is provided at the distal end in the expanding/contracting direction of the collapsible unit. When a disc is inserted into the disc insertion slot, the collapsible unit is expanded. Therefore, the depth dimension is reduced when unused. A disc is inserted in the same direction as the collapsible unit moving direction, and an operation area may be ensured only in one direction of the expanding/contracting direction. This realizes a disc drive apparatus which saves space even during operation including insertion of a disc. This makes it easy to incorporate a disc drive apparatus in other apparatus.

When a recording medium is inserted, the collapsible unit projects from the outside housing, the operation key section is exposed to the outside, and the disc drive apparatus becomes ready to use. Therefore, the disc drive apparatus can be made very compact with a simple structure, and can be mounted in the flat-type display unit, for example. It is possible to provide a practical disc drive apparatus with good operability.

Next, explanation will be given on a flat-type display device according to a second embodiment of the invention. FIGS. 32A and 32B show the external views of a flat-type display device provided with the disc drive apparatus 2. The configuration of the disc drive apparatus 2 is the same as in the first embodiment described hereinbefore, and detailed explanation will be omitted.

According the second embodiment, a display device comprises a display panel 1b and a flat rectangular outer housing 1c. The disc drive apparatus 2 is provided above the display panel 1b and on the top of the outer housing 1c. The front side of the disc drive apparatus 2, the upper surface 2a here, has a disc insertion slot 3 to insert and eject a disc. When the disc drive apparatus 2 is unused, the upper side of the outer housing 1c and the upper surface 2a of the disc drive apparatus 2 are on substantially the same plane.

FIG. 32B shows the state that a disc is inserted. The upper surface 2a of the disc drive apparatus 2 projects upward with respect to the upper side of the outer housing of the display device 1. In this time, the depth dimension of the disc drive apparatus 2 in the disc inserting direction is reduced, and an influence to a control circuit of the display device 1 can be reduced. Therefore, a thin flat-type display device can be easily provided.

Next, explanation will be given on a flat-type display device according to a third embodiment of the invention. FIGS. 33A and 33B show the external views of a flat-type display device incorporated with the disc drive apparatus 2. The configuration of the disc drive apparatus 2 is the same as in the first embodiment described hereinbefore, and detailed explanation will be omitted.

According to the third embodiment, a display device comprises a display panel 1b and a flat rectangular outer housing 1c. The disc drive apparatus 2 is provided on the side of the display panel 1b and on the side of the outer housing 1c. The front side of the disc drive apparatus 2, a side surface 2a here, has a disc insertion slot 3 for inserting and ejecting a disk. When the disc drive apparatus 2 is unused, the side of the outer housing 1c and the surface 2a of the disc drive apparatus 2 are on substantially the same plane.

FIG. 33B shows the state that a disc is inserted. The side surface 2a of the disc drive apparatus 2 projects sideways with respect to the upper side of the outer housing of the display device 1. In this time, the depth dimension of the disc drive apparatus 2 in the disc inserting direction is reduced, and an influence to a control circuit of the display device 1 can be reduced. Therefore, a thin flat-type display device can be easily provided.

The present invention is not limited directly to the embodiments described above, and its components may be embodied in modified forms without departing from the scope or spirit of the invention. Further, various inventions may be made by suitably combining a plurality of components described in connection with the foregoing embodiments. For example, some of the components according to the foregoing embodiments may be omitted. Furthermore, components according to different embodiments may be combined as required.

What is claimed is:

1. A disc drive apparatus comprising:
    a disc drive section which holds and rotates a disc-shaped recording medium, and performs information processing for the recording medium;
    a fixed unit on which the disc drive is arranged;
    a collapsible unit which is held movably in a predetermined expanding/contracting direction, between a contracted position wherein the collapsible unit is laid over the fixed unit and an expanded position wherein at least a part of the collapsible unit projects from the fixed unit to define a disc housing area capable of housing the recording medium, and has a distal end surface provided in the expanding direction of the expanding/contracting direction, and a disc insertion opening provided in the distal end surface, through which the recording medium is inserted into and ejected from the disc housing area in the expanding/contracting direction;
    an expansion/contraction mechanism which moves the collapsible unit to the fixed unit in the expanding/contracting direction;
    a disc loading mechanism which loads the recording medium inserted through the disc insertion opening, on the disc drive section; and
    an outer housing which is fixed to the fixed unit, covers the fixed unit and the collapsible unit moved to the contracted position, and has a front side provided with a window capable of passing the collapsible unit,
    the collapsible unit including an outer surface exposed to the outside of the outer housing when moved to the expanded position, and an operation panel for setting operation states, which is provided on the outer surface of the collapsible unit and operable from the outside of the outer housing.

2. The disc drive apparatus according to claim 1, wherein the outer housing is formed of an outer housing of a flat-type display unit incorporated with a display panel.

3. The disc drive apparatus according to claim 1, wherein the outer surface of the collapsible unit includes an upper surface portion which extends in the expanding direction and on which the operation panel is provided.

4. The disc drive apparatus according to claim 3, wherein the operation panel includes an operation key substrate fixed to the outer surface of the collapsible unit, and switches mounted on the operation key substrate.

5. The disc drive apparatus according to claim 1, further comprising a slide support mechanism which holds the collapsible unit on the fixed unit to be movable in the expanding/contracting direction.

* * * * *